(12) United States Patent
Gu et al.

(10) Patent No.: US 8,211,593 B2
(45) Date of Patent: *Jul. 3, 2012

(54) LOW PLATINUM FUEL CELLS, CATALYSTS, AND METHOD FOR PREPARING THE SAME

(75) Inventors: Tao Gu, Moraga, CA (US); Thomas R. Omstead, Fremont, CA (US); Ning Wang, Martinez, CA (US); Yi Dong, Tracy, CA (US); Yi-Qun Li, Walnut Creek, CA (US)

(73) Assignee: Intematix Corporation, Fremont, CA (US)

(*) Notice: Subject to any disclaimer, the term of this patent is extended or adjusted under 35 U.S.C. 154(b) by 1308 days.

This patent is subject to a terminal disclaimer.

(21) Appl. No.: 11/303,476

(22) Filed: Dec. 15, 2005

(65) Prior Publication Data

US 2006/0172179 A1 Aug. 3, 2006

Related U.S. Application Data

(63) Continuation-in-part of application No. 10/898,669, filed on Jul. 23, 2004, now abandoned, which is a continuation-in-part of application No. 10/823,088, filed on Apr. 12, 2004, now Pat. No. 7,351,444.

(60) Provisional application No. 60/549,712, filed on Mar. 2, 2004.

(51) Int. Cl.
*H01M 4/90* (2006.01)
*H01M 4/96* (2006.01)
*B01J 23/00* (2006.01)
*B01J 23/42* (2006.01)
*B01J 23/56* (2006.01)
*B01J 23/63* (2006.01)
*B01J 23/648* (2006.01)

(52) U.S. Cl. .................................................. 429/524
(58) Field of Classification Search .................. 428/408; 420/451; 427/115; 429/30, 40–42, 487, 429/524, 527; 977/948; 502/102, 325, 326
See application file for complete search history.

(56) References Cited

U.S. PATENT DOCUMENTS 4,031,291 A 6/1977 Fullenwider
(Continued)

FOREIGN PATENT DOCUMENTS

EP 0 933 825 A2 8/1999
(Continued)

OTHER PUBLICATIONS

Bekyarova, et al. (2002) Oxidation and Porosity Evaluation of Bud-like Single-Wall Carbon Nanohorn Aggregates. *American Chemical Society*, 18(10): 4138-4141.
(Continued)

*Primary Examiner* — Gregg Cantelmo
(74) *Attorney, Agent, or Firm* — Gary Baker; Quine Intellectual Property Law Group, P.C.

(57) ABSTRACT

This invention provides novel fuel cell electrodes and catalysts comprising a series of catalytically active thin-film metal alloys with low platinum concentration supported on nanostructured materials (nanoparticles). Processing of the electrodes and catalysts can include electrodeposition methods, and high-pressure coating techniques. In certain embodiments, an integrated gas-diffusion/electrode/catalyst layer can be prepared by processing catalyst thin films and nanoparticles into gas-diffusion media such as Toray or SGL carbon fiber papers. The catalysts can be placed in contact with an electrolyte membrane for PEM fuel cell applications.

27 Claims, 27 Drawing Sheets

U.S. PATENT DOCUMENTS

| | | |
|---|---|---|
| 4,202,934 A | 5/1980 | Jalan |
| 4,214,969 A | 7/1980 | Lawrance |
| 4,316,944 A | 2/1982 | Landsman et al. |
| 4,395,322 A * | 7/1983 | Harris ................. 204/290.08 |
| 4,447,506 A | 5/1984 | Luczak et al. |
| 4,613,582 A * | 9/1986 | Luczak et al. ............. 502/185 |
| 4,637,309 A | 1/1987 | Cafferty |
| 4,711,829 A | 12/1987 | Luczak et al. |
| 4,716,087 A | 12/1987 | Ito et al. |
| 4,794,054 A | 12/1988 | Ito et al. |
| 4,812,352 A | 3/1989 | Debe |
| 4,880,711 A | 11/1989 | Luczak et al. |
| 4,916,110 A | 4/1990 | Manniso |
| 4,956,131 A | 9/1990 | Shigeta et al. |
| 5,024,905 A | 6/1991 | Itoh et al. |
| 5,039,561 A | 8/1991 | Debe |
| 5,079,107 A | 1/1992 | Jalan |
| 5,176,786 A | 1/1993 | Debe |
| 5,183,713 A | 2/1993 | Kunz |
| 5,192,641 A | 3/1993 | Shaw et al. |
| 5,225,391 A | 7/1993 | Stonehart et al. |
| 5,238,729 A | 8/1993 | Debe |
| 5,336,558 A | 8/1994 | Debe |
| 5,338,430 A | 8/1994 | Parsonage et al. |
| 5,653,951 A | 8/1997 | Rodriguez et al. |
| 5,856,036 A | 1/1999 | Smotkin et al. |
| 5,879,827 A | 3/1999 | Debe et al. |
| 6,007,934 A | 12/1999 | Auer et al. |
| 6,015,635 A | 1/2000 | Kawahara |
| 6,040,077 A | 3/2000 | Debe et al. |
| 6,080,357 A | 6/2000 | Sugikawa |
| 6,099,965 A * | 8/2000 | Tennent et al. ............. 428/408 |
| 6,159,538 A | 12/2000 | Rodriguez et al. |
| 6,287,717 B1 | 9/2001 | Cavalca et al. |
| 6,300,000 B1 | 10/2001 | Cavalca et al. |
| 6,309,772 B1 | 10/2001 | Zuber et al. |
| 6,333,016 B1 | 12/2001 | Resasco et al. |
| 6,339,038 B1 | 1/2002 | Tada et al. |
| 6,359,288 B1 | 3/2002 | Ying et al. |
| 6,451,175 B1 | 9/2002 | Lal |
| 6,454,816 B1 | 9/2002 | Lee et al. |
| 6,458,478 B1 | 10/2002 | Wang et al. |
| 6,471,936 B1 | 10/2002 | Chen et al. |
| 6,475,249 B1 * | 11/2002 | Hsu et al. ................. 29/623.1 |
| 6,485,858 B1 | 11/2002 | Baker et al. |
| 6,517,800 B1 * | 2/2003 | Cheng et al. ............. 423/447.1 |
| 6,517,965 B1 | 2/2003 | Gorer |
| 6,531,704 B2 | 3/2003 | Yadav et al. |
| 6,562,499 B1 | 5/2003 | Naka et al. |
| 6,572,997 B1 | 6/2003 | Iqbal et al. |
| 6,576,358 B2 | 6/2003 | Gebhardt |
| 6,581,280 B2 | 6/2003 | Curico et al. |
| 6,589,312 B1 | 7/2003 | Snow et al. |
| 6,589,682 B1 | 7/2003 | Fleckner et al. |
| 6,591,617 B2 | 7/2003 | Wolfe |
| 6,627,689 B2 | 9/2003 | Iino et al. |
| 6,645,628 B2 | 11/2003 | Shiffler, Jr. et al. |
| 6,654,229 B2 | 11/2003 | Yanagisawa et al. |
| 6,660,680 B1 | 12/2003 | Hampden-Smith et al. |
| 6,667,099 B1 | 12/2003 | Greiner et al. |
| 6,672,077 B1 | 1/2004 | Bradley et al. |
| 6,679,280 B1 | 1/2004 | Pinto |
| 6,683,783 B1 | 1/2004 | Smalley et al. |
| 6,689,439 B2 | 2/2004 | Sobolewski |
| 6,689,711 B2 | 2/2004 | Lefebvre |
| 6,706,431 B2 | 3/2004 | Kawamura et al. |
| 6,706,437 B2 | 3/2004 | Trapp et al. |
| 6,709,471 B2 | 3/2004 | Miyamoto |
| 6,709,560 B2 | 3/2004 | Andelman et al. |
| 6,712,864 B2 | 3/2004 | Horiuchi et al. |
| 6,713,519 B2 | 3/2004 | Wang et al. |
| 6,731,022 B2 | 5/2004 | Silverman |
| 6,733,828 B2 | 5/2004 | Chao et al. |
| 6,746,790 B2 | 6/2004 | Colborn |
| 6,749,827 B2 | 6/2004 | Smalley et al. |
| 6,753,108 B1 | 6/2004 | Hampden-Smith et al. |
| 6,764,785 B2 | 7/2004 | Colborn et al. |
| 6,780,388 B2 | 8/2004 | Masuko et al. |
| 6,781,817 B2 | 8/2004 | Andelman |
| 6,821,663 B2 | 11/2004 | McElroy et al. |
| 6,824,912 B2 | 11/2004 | Yamaura et al. |
| 6,846,345 B1 | 1/2005 | Keller et al. |
| 6,854,688 B2 | 2/2005 | McElroy et al. |
| 6,858,521 B2 | 2/2005 | Jin |
| 6,863,942 B2 | 3/2005 | Ren et al. |
| 6,869,583 B2 | 3/2005 | Harutyunyan et al. |
| 6,869,721 B2 | 3/2005 | Imazato |
| 6,872,330 B2 | 3/2005 | Mack et al. |
| 6,884,405 B2 | 4/2005 | Ryzhkov |
| 6,911,260 B2 | 6/2005 | Ren et al. |
| 6,913,075 B1 | 7/2005 | Knowles et al. |
| 7,351,444 B2 * | 4/2008 | Wang et al. ................. 427/115 |
| 2001/0036523 A1 | 11/2001 | Sobolewski |
| 2001/0041160 A1 * | 11/2001 | Margrave et al. ............. 423/460 |
| 2002/0034675 A1 * | 3/2002 | Starz et al. ................. 429/42 |
| 2003/0203139 A1 * | 10/2003 | Ren et al. ................. 428/34.3 |
| 2004/0018416 A1 | 1/2004 | Won-Bong et al. |
| 2004/0167014 A1 * | 8/2004 | Yan et al. ................. 502/101 |
| 2004/0197638 A1 | 10/2004 | McElrath et al. |
| 2005/0053826 A1 * | 3/2005 | Wang et al. ................. 429/44 |
| 2005/0255236 A1 * | 11/2005 | Deng et al. ................. 427/180 |

FOREIGN PATENT DOCUMENTS

| | | |
|---|---|---|
| EP | 0 949 704 A1 | 10/1999 |
| EP | 0 955 686 A1 | 11/1999 |
| EP | 0 975 040 A1 | 1/2000 |
| EP | 1 030 393 A1 | 8/2000 |

OTHER PUBLICATIONS

Che et al. (1998) Carbon Nanotubule Membranes for Electrochemical Energy Storage and Production,*Nature*, 393: 346-349.

Chu and Jiang (2002) "Novel electrocatalysts for direct methanol fuel cells." *Solid State Ionics*, 148(3-4): 591-599.

Haug et al. (2002) "Development of a Novel CO Tolerant Proton Exchange Membrane Fuel Cell Anode." *Journal of the Electrochemical Society*, 149 (7) A862-A867.

EP Search Report from EP Application No. 05730186.3.

Sun et al. (2003) "Composite electrodes made of Pt nanoparticles deposited on carbon nanotubes grown on fuel cell backings." *Chemical Physica Letters*, 379: 99-104.

Wang et al. (2004) "Proton Exchange Membrane Fuel Cells with Carbon Nanotube Based Electrodes." *Nano Letters*, 4(2): 345-348.

* cited by examiner

LOW PLATINUM FUEL CELLS, CATALYSTS, AND METHOD FOR PREPARING THE SAME

CROSS-REFERENCE TO RELATED APPLICATIONS

This application is a continuation in part of and claims priority to and benefit of application U.S. Ser. No. 10/898,669, filed Jul. 23, 2004 (now abandoned); which is a continuation-in-part and claims priority and benefit of U.S. Ser. No. 10/823,088, filed on Apr. 12, 2004 (now U.S. Pat. No. 7,351,444); which claims priority to and benefit of U.S. Ser. No. 60/549,712, filed on Mar. 2, 2004; all of which are incorporated herein by reference in their entirety for all purposes.

FIELD OF THE INVENTION

This invention is in the field of electrochemical catalysts used in fuel cells (e.g., in polymer electrolyte membrane (PEM) fuel cells). The invention is related to the reduction of the platinum contents and the improvement of the catalytic efficiency by innovative catalyst compositions and nanostructures at the interfaces, or inside a gas micro distribution (microdiffusion) layer, between the electrodes and the polymer electrolyte (PEM) comprising the fuel cell.

BACKGROUND OF THE INVENTION

Fuel cells combine hydrogen and oxygen without combustion to form water and to produce direct electric current. The process can be described as electrolysis in reverse. Fuel cells have potential for stationary and portable power applications; however, the commercial viability of fuel cells for power generation in stationary and portable applications depends upon solving a number of manufacturing, cost, and durability problems.

Electrochemical fuel cells convert fuel and an oxidant into electricity and a reaction product. A typical fuel cell consists of a membrane and two electrodes,—a cathode and an anode. The membrane is sandwiched between the cathode and anode. Fuel, in the form of hydrogen, is supplied to the anode, where a catalyst, such as platinum and its alloys, catalyzes the following reaction: $2H_2 \rightarrow 4H^+ + 4e^-$.

At the anode, hydrogen separates into hydrogen ions (protons) and electrons. The protons migrate from the anode through the membrane to the cathode. The electrons migrate from the anode through an external circuit in the form of electricity. An oxidant, in the form of oxygen or gasses that contain oxygen, including air, is supplied to the cathode, where it reacts with the hydrogen ions that have crossed the membrane and with the electrons from the external circuit to form liquid water as the reaction product. The reaction is typically catalyzed by the platinum metal family. The reaction at the cathode is summarized as follows: $O_2 + 4H^+ + 4e^- \rightarrow 2H_2O$.

The successful conversion of chemical energy into electrical energy in a primitive fuel cell was first demonstrated over 160 years ago. However, in spite of the attractive system efficiencies and environmental benefits associated with fuel-cell technology, it has proven difficult to develop the early scientific experiments into commercially viable industrial products. Problems have often been associated with lack of appropriate materials that would enable the cost and efficiency of electricity production to compete with existing power technology.

Polymer electrolyte fuel cells have improved significantly in the past few years both with respect to efficiency and with respect to practical fuel cell design. Some prototypes of fuel-cell replacements for portable batteries and for automobile batteries have been demonstrated. However, problems associated with the cost, activity, and stability of the electrocatalysts are major concerns in the development of the polymer electrolyte fuel cell. For example, platinum (Pt)-based catalysts are the most successful catalysts for fuel cell and other catalytic applications. Unfortunately, the high cost and scarcity of platinum has limited the use of this material in large-scale applications.

In addition, poisoning at the anode by carbon monoxide has been a problematic with the use of platinum. On the cathode side, higher catalyst levels have been desired because methanol and other carbon containing fuel passing through the membrane react with oxygen on the cathode under catalytic effect of platinum thereby decreasing the efficiency of the full cell.

To improve the catalytic efficiency and reduce the cost, other noble metals and non-noble metals can be used as catalysts in the form of Pt alloys. The noble metals such as Pd, Rh, Ir, Ru, Os, Au, etc have been investigated. The non-noble metals including Sn, W, Cr, Mn, Fe, Co, Ni, Cu, etc (U.S. Pat. No. 6,562,499) has also been tried. Different Pt-alloys were disclosed as catalysts for fuel cell applications. Binary Alloys useful as catalysts include Pt—Cr (U.S. Pat. No. 4,316,944), Pt—V (U.S. Pat. No. 4,202,934), Pt—Ta (U.S. Pat. No. 5,183,713), Pt—Cu (U.S. Pat. No. 4,716,087), Pt—Ru (U.S. Pat. No. 6,007,934), Pt—Y (U.S. Pat. No. 4,031,291) etc. Ternary alloys useful as catalysts include Pt—Ru—Os (U.S. Pat. No. 5,856,036), Pt—Ni—Co, Pt—Cr—C, Pt—Cr—Ce (U.S. Pat. No. 5,079,107), Pt—Co—Cr (U.S. Pat. No. 4,711,829), Pt—Fe—Co (U.S. Pat. No. 4,794,054), Pt—Ru—Ni (U.S. Pat. No. 6,517,965), Pt—Ga—Cr, Co, Ni (U.S. Pat. No. 4,880,711), Pt—Co—Cr (U.S. Pat. No. 4,447,506), etc. Quaternary Alloys useful as catalysts includes Pt—Ni—Co—Mn (U.S. Pat. No. 5,225,391), Pt—Fe—Co—Cu (U.S. Pat. No. 5,024,905), etc. On the anode side, Ru can play an important role in reducing the poison problem (Journal of The Electrochemical Society, (149 (7) A862-A867, 2002) (U.S. Pat. No. 6,339,038). Ru has the ability to form OHads from water. This allows the catalytic desorption of CO as $Co_2$. On the cathode side, non-noble metal complex catalysts, such as Fe, Co, and Ni porphyrins have been utilized (*Solid State Ionics* 148 (2002) 591-599).

In the design of electrodes, a three-phase boundary of reaction gases ($H_2$ and $O_2$), catalysts and conductors (for proton and electron) is commonly required for the electrochemical reaction. An extensively used approach to fuel cell fabrication is the so-called "ink" coating method. In this method, catalyst particles (e.g., 2-4 nm) are supported on carbon particles (15 nm of Vulcan XC72). These particles are mixed with a solution of polymer electrolyte as an ink, which is smeared on the surface of a conductor, such as carbon paper, to form a three-phase coating. In this approach, an electrolyte film covers the mixed particles of catalyst and carbon. Therefore, no direct three-phase boundary exists in this structure. Reaction gases, $H_2$ and $O_2$ do not directly contact the catalyst, but rather, must diffuse through the electrolyte layer to reach the catalyst surface. On the cathode side, protons must diffuse through the electrolyte layer to reach $O_2$—ions. Therefore, there exists two opposite requirements: Protons need a thick electrolyte layer to maintain good conductivity. On the other hand, a thick electrolyte layer forms a diffusion barrier for $O_2$. To solve this difficulty, some improvements have been suggested for the "ink" coating design. Toyota company (in U.S. Pat. No. 6,015,635) suggested the use of pure electrolyte clusters inserted into the "ink" coating layer to increase proton conductivity. In U.S. Pat. No. 6,309,772, it is suggested that electrolyte coated and un-coated carbon-catalyst particles are mixed to form the "ink" layer to improve gas diffusion. In these "ink" coating structures, the efficiency of the catalysts are still restricted by gas and proton diffusion.

More recently some new catalyst structures were used to increase the catalytic efficiency. For example, 3M Company (U.S. Pat. Nos. 5,879,827 and 6,040,077) used a nanostructure electrode. In this structure, an acircular nano-polymer whisker supports deposited acircular nanoscopic catalytic particles. At first, an organic material is deposited on a substrate. Then the deposited layer is annealed in vacuum, and forms a dense array of acircular nano polymer whiskers. The preferred length of the whiskers is equal or less than 1 micrometer. Then, catalyst thin film is deposited on the supporting whiskers. The diameter of catalyst particle film constituents is less than 10 nm, and the length is less than 50 nm. In a Pt and Ru loading range of 0.09-0.425 mg/cm$^2$, the fuel cell obtained a satisfactory catalytic efficiency. However the process is complicated by the high electrical resistance of the nano-polymer whiskers and the difficulty of transferring the catalyst coated polymer whisker layers onto carbon electrodes. Pt mixed carbon inks are still used under the whisker layer in this design.

Gore Enterprise Holdings (U.S. Pat. Nos. 6,287,717 and 6,300,000) used a direct catalyst thin film coating on carbon electrodes or on Pt mixed carbon ink layers. The catalyst thin film played an important role as an interface layer which could have a different platinum concentration than the rest of catalyst layers. This structure effectively reduced the platinum contents of the catalyst used in the fuel cells. A catalyst loading less than 0.1 mg/cm$^2$ was claimed.

In view of the above, a need remains for methods and compositions that efficiently and rapidly convert fuels and oxidizers into electric current. Significant benefits could result from techniques to form catalyst layers having large surface areas formed using small amounts of platinum. The present invention provides these and other features that will become apparent upon review of the following.

SUMMARY OF THE INVENTION

The invention provides novel fuel cell catalysts comprising new series of thin-film metal alloy catalysts with low platinum concentration supported on nanostructured materials (nanoparticles). In certain embodiments, the integrated gas-diffusion/electrode/catalysts layer can be prepared by processing catalyst thin films and nanoparticles into gas-diffusion media such as Toray or SGL carbon fiber papers, carbon fiber cloths, porous electrodes, and the like. The catalysts can be placed in contact with an electrolyte membrane for PEM fuel cell applications. The migration of protons through the integrated catalyst-electrode layers can be facilitated by coating the catalyst layer on nanoparticles with an ionic polymer. The layered structures of CNT catalysts, CNT, and Pt or Pt alloys can be efficiently processed at high throughput using vapor deposition systems with multiple deposition chambers and capable of processing multiple targets without breaking system vacuum.

Thus, one embodiment of this invention provides a composition comprising a substrate comprising a plurality of conductive fibers (e.g., carbon fibers, metal fibers, porous electrodes, etc.) bearing nanoparticles (e.g., nanotubes, nanofibers, nanohoms, nanopowders, nanospheres, quantum dots, etc.). In certain embodiments, the conductive fibers are not themselves nanoparticles or nanofibers. The plurality of fibers can comprise a porous electrode and/or a carbon paper, carbon cloth, carbon impregnated polymer, a porous conductive polymer, a porous metal conductor, etc. In certain embodiments, the nanoparticles comprise carbon nanotubes and the nanotubes are seeded with one or more nanotube growth catalysts selected from the group consisting of $Fe_xNi_yCo_{1-x-y}$ where $0<x<1$ and $0<y<1$, $Co_{1-x}Mo_x$ where $0 \leq x \leq 0.3$, $Co_{1-x-y}Ni_xMo_y$ where $0.1 \leq x \leq 0.7$ and $0 \leq y \leq 0.3$, $Co_{1-x-y-z}Ni_xV_yCr_z$ where $0 \leq x \leq 0.7$ and $0 \leq y \leq 0.2$, $0 \leq z \leq 0.2$, $Ni_{1-x-y}Mo_xAl_y$ where $0 \leq x \leq 0.2$ and $0 \leq y \leq 0.2$, and $Co_{1-x-y}Ni_xAl_y$ where $0 \leq x \leq 0.7$ and $0 \leq y \leq 0.2$. Certain preferred nanotube growth catalysts include, but are not limited to $Co_{8.8}Mo_{1.2}$, $Co_{2.2}Ni_{5.6}Mo_{2.2}$, $Co_{5.7}Ni_{2.1}V_{1.1}Cr_{1.1}$, $Ni_{8.0}Mo_{1.0}Al_{1.0}$, and $Co_{6.4}Ni_{2.4}Al_{1.2}$. In various embodiments, the nanoparticles are nanotubes having a length less than 500 µm and/or a width/diameter less than about 100 nm or less than about 50 nm. The nanoparticles are typically coated with a substantially continuous thin film, preferably a catalytically active thin film, e.g., a film comprising platinum or a platinum alloy. The thin film can partially or completely cover the nanoparticles and, in certain embodiments, ranges in thickness from about 1 to about 1000 angstroms, more typically from about 5 to about 500 or 100 angstroms.

It can be beneficial to coat the substrate gas diffusion layer with a hydrophobic material, such as Teflon®. This coating can help wick away water generated during the operation of a fuel cell. However, it is also often desirable that the adjacent (typically substrate bound) nanoparticle catalyst support layer remain hydrophilic and electrically conductive. Therefore, it can be desirable to control the depth of hydrophobic coatings or depth of nanostructure hydrophilic character during processing or for improved operation of the electrodes of the invention. In one aspect of the invention, the Teflon coating on nanostructures are controllably etched with a plasma, e.g., to clear a nanostructure surface or improve interaction with polar solvents. For example, an electrode comprising a substrate layer bearing nanostructures can be coated throughout with a hydrophobic material, e.g. Teflon or Aluminum Oxide, to help shed water from the electrode. A region of the electrode can then be selectively etched (plasma or wet etch) so as to allow the deposition of platinum/alloy directly on the conductive carbon, bound nanoparticles, or metal matrix substrate rather than on the hydrophobic coating. In this manner the platinum/alloy can be formed in intimate electrical contact with the electrode while the bulk on the electrode is coated with a non-conducting hydrophobic material.

Plasma etching can be used in methods of the invention in a variety of ways to select electrode surfaces for treatments that affect the character of the surfaces. In many such methods, the etching plasma is an argon ion plasma. The depth of etching into an electrode layer can be used to select surfaces for modification. For example, the depth of etching can be controlled by adjusting the time and/or intensity of a plasma etching treatment. Nanostructure surfaces treated by plasma etching can receive coatings that are rejected by untreated surfaces. For example, etched nanostructures can receive a coat of an ionomer, e.g., under high pressure, that would be rejected by untreated nanostructures. In another example, plasma etched nanostructures can have enhanced wettability for electroplating solutions so that metals can be more extensively, more uniformly, and/or more efficiently electrodeposited onto the nanostructures.

For methods of coating electrode substrates, as described above, the porous substrate can include any of a variety of porous materials, such as, e.g., carbon fiber papers, carbon fiber cloths, metal matrices, and porous electrodes. The preferred coating material is an emulsion of a polytetrafluoroethylene. The substrate can be contacted with the coating material, e.g., by dipping, spraying or brushing.

In a typical embodiment, the nanoparticle catalyst support layer is formed from carbon nanoparticles (CNTs) and the polar liquid is an aqueous solution. The support layer can be contacted with the polar liquid, e.g., by dipping, spraying or brushing. The polar liquid can be removed from the support layer, e.g., by heating or drying.

In a preferred embodiment, the electrode is heated after coating the substrate with the hydrophobic material. The heating can sinter the electrode, spread and fuse the hydrophobic material coating on substrate surfaces, and/or remove residual hydrophobic media from the support layer. The heating can include exposure of the electrode to temperatures ranging, e.g., from about 100° C. to about 25,000° C., from about 150° C. to about 1,000° C. or about 300° C. In one aspect of the invention, the heating can be continued until hydrophobic media residue is removed from the support layer or the support layer is converted to a more hydrophilic form.

In addition to Teflon, alternative hydrophobic coatings can be utilized. For example, aluminum oxide can be deposited using atomic layer deposition (ALD) and optionally treated with perfluoroalkylsilanes. Aluminum oxide coating by ALD can provide a hydrophobic region resistant to the higher temperatures associated with nanoparticle/nanotube deposition. The very thin, conformal aluminum oxide film is also easier to sputter away from the surface prior to the deposition of the nickel, iron, or cobalt based catalyst used for nanotube growth. Alternatively ALD aluminum oxide can be deposited after nanotube growth and etched away from the top surface of the nanotubes for deposition of the platinum/platinum alloy catalyst. Perfluoroalkylsilanes can be attached to the ALD aluminum oxide by vapor or liquid exposure.

For the above methods of coating electrode substrates the porous substrate can include any of a variety of porous materials, such as, e.g., carbon fiber papers, carbon fiber cloths, and porous electrodes. The preferred coating material is an emulsion of a polytetrafluoroethylene. The substrate can be contacted with the coating material, e.g., by dipping, spraying or brushing.

Catalyst metals can be coated onto nanostructures (e.g., catalyst support layers) of an electrode by an electro-deposition processes. A method of preparing an electrode can include, e.g., forming a plurality of nanotubes on a substrate and electrodepositing a catalytic metal onto the nanotubes. As with many electrodes of the invention, the nanotubes can comprise carbon nanotubes. The substrate can comprise a plurality of conductive fibers, e.g., a plurality of carbon fibers forming a porous electrode. These electrodes are well adapted for use as fuel cell electrodes.

Electrodeposition of catalytic metals onto electrode nanostructures can include, e.g., exposure of the nanotubes to electric current while in contact with an electrolyte solution of the metals. We find a pulsed voltage or pulsed current in a solution of the metals can provide improved coating in many such processes. Electrodeposition onto nanostructures of the electrodes can be improved by first forming a metallic seed layer on the nanostructures before the electrodeposition. The seed layer can be formed, e.g., by sputtering or vapor deposition of the seed layer onto the nanostructures (e.g., nanotubes). A seed layer with a thickness of about 25 Å or less typically proves adequate, e.g., to help direct and accelerate the catalyst metal deposition process.

The penetration depth of electrodeposition onto a nanostructure layer can be controlled in many cases, e.g., by controlling the electric current magnitude, e.g., by adjusting the conductivity of the plating solution. For example, electrodeposition depth can be decreased by exposing the nanotubes to the deposition current in a lower conductivity solution of the desired metal to obtain a shallower deposition of the metal onto the nanotubes. Alternately, exposing the nanotubes to a deposition current in a higher conductivity solution of the metal can increase the depth of electrodeposition. The plating solution conductivity can be controlled, e.g., by adjusting the pH of the solution, adjusting the concentration of supporting electrolyte, adjusting the concentration of the metal salt, adjusting proportions of non-aqueous solvents, and/or the like.

In another method of deposition control, the depth of electrodeposition can be affected by saturating the support layer nanotubes with a low ionic strength solution before placing the nanotubes in an electrolyte comprising the metal. The delay time between placing the nanotube layer in contact with the plating solution and initiating electrodepositing currents can affect the depth of metal deposition. For example, a short delay can result in a shallow penetration of metal deposition and a longer delay can result in a deeper penetration of metal deposition within the nanostructure layer of an electrode.

In many cases, particularly when the nanostructure layer is a carbon nanotube layer, electrodeposition can be improved by modifying the wetting properties of the plating solution. For example, where the nanostructure retains significant hydrophobic character, the plating solution can include additives, such as, e.g., non-ionic detergents, amphiphilic molecules, or organic compounds with polar groups to improve functional contact between the nanostructure and plating solution. In a preferred embodiment, we have found that the wettability of nanotube layers, and electrodeposition onto the nanotubes, can be significantly improved by adding isopropanol to the plating solution.

It can be desirable to coat the catalysts layer with an ionic material, such as an ionic polymer, to support transfer of protons between fuel cell compartments. With regard to many composite membrane/electrodes of the invention, the catalysts coated nanoparticles of the electrode layer can be coated with an ionomer, such as a perfluorocarbonsulfonic acid ionomer (e.g., a Nafion®). The membrane/electrode can optionally have a substrate (porous membrane) coated with a Teflon (a polytetrafluoroethylene) or aluminum oxide, as described above. In a preferred method of coating nanoparticle supported catalysts with an ionomer, the nanoparticle supported catalysts are contacted with the ionomer before or after being placed in a pressure vessel. The ionomer contacted nanoparticles are exposed to high pressures in the pressure vessel. The pressurization can, e.g., provide a more uniformly dispersed coating of the nanoparticles than is typically provided by contact without exposure to high pressure. In one aspect of the invention, fuel cells are provided with electrodes having a porous conductive substrate bearing a plurality of nanoparticles pressure coated with an ionomer.

Many of the electrode substrates generally described herein can be coated as described above. Because the electrodes must be conductive, it is preferred that the substrate possess significant conductivity. For example, preferred substrates for coating are made up of conductive materials, such as, e.g., carbon paper, carbon cloth, carbon-impregnated polymers, and the like. It is preferred that the conductive fibers be porous to gasses, even after the coating process. Alternately, the plurality of substrate conductive fibers subject to coating can comprise a porous metal sheet.

The nanoparticles (nanostructures) of coated electrodes are typically those generally described, herein. For example, nanoparticles can be nanotubes, nanofibers, nanohorns, nanopowders, nanospheres, quantum dots, nanotubes, and/or the like. In a preferred embodiment, the nanoparticles include carbon nanotubes. The nanotubes in the electrodes typically have a length ranging from about 0.5 µm to about 200 µm or from about 1 µm to about 20 µm or about 10 µm. The nanotubes in the electrodes typically have a diameter ranging from about 1 nm to about 500 nm, from about 5 nm to about 100 nm, or about 10 nm. A preferred ionomer for coating the nanoparticles is a perfluorocarbonsulfonic acid ionomer. The nanoparticles, e.g., in fuel cell applications, can be coated with a substantially or partially continuous thin film comprising a platinum alloy.

The proton conductive coatings on the nanoparticle supported catalysts can include any of a variety of polyion materials. The ionomer can be, e.g., a polymer or copolymer having substantial ionic character. A preferred ionomer is perfluorocarbonsulfonic acid ionomer. The ionomer can coat the nanoparticles of the electrode in the thin film that partially or fully covers the nanoparticles. The ionomer film coating of nanoparticles can range in thickness, e.g., from about 1 Å to about 1000 Å, from about 5 Å to about 500 Å, from about 10 Å to about 100 Å, or about 25 Å. The coating can cover from about 100% to less than about 10% of the nanoparticle surface, from about 95% to about 25%, from about 90% to about 50%, from about 80% to about 75%.

Methods of providing electrodes with ionomer coated nanoparticle supported catalyst layers are described herein. Generally the methods include a pressure treatment that we have found improves the efficiency, extent, and/or quality of ionomer coating onto nanoparticles. The ionomer coating can include pressure treatment before or after the initial contact between the nanoparticles and the ionomer. The initial contacting can take place within the pressure vessel or occur before introduction of the nanoparticles into the pressure vessel. The pressure can range, e.g., between about 100 psi to about 20,000 psi, from about 200 psi to about 10,000 psi, from about 500 psi to about 7,500 psi, or about 5,000 psi. The pressure vessel can be pressurized, e.g., by introducing a pressurized gas, by applying force to a liquid with a mechanically driven piston, by an impact or explosive shock transferred through an interior wall of the vessel, or the like. After treatment the nanoparticles can be washed and/or dried before a repeated cycle of contacting with ionomer and pressurization. Further rounds of pressure coating can accumulate an ionomer coating on the nanoparticles until a desired surface coverage, thickness, or weight percentage of ionomer is attained. Improved ionomer coating can be provided in many cases by pretreating the nanoparticles by exposure to a vacuum or by sonication before the pressure treatment step.

In another aspect of the invention, we have found that the locations of ionomer coating on a nanoparticle layer can be controlled. For example, an ionomer solution or emulsion can come into directed contact with a nanoparticle layer, e.g., in a desired pattern, by spraying or brushing the ionomer onto the nanoparticles. The pattern can be directed by the use of masking techniques. The localized contact can be, e.g., dispersed to deeper zones of the nanoparticle layer, by pressure treatment. In a particular embodiment, a pattern of Nafion emulsion sprayed onto outer zones of a nanotube layer diffused to coat lower zones of the nanotubes (but not substantially coating nanotubes on the layer outside the pattern) during a pressure treatment that included further contacting the nanoparticles with isopropyl alcohol.

In many of the compositions or methods of the invention, e.g., a coat of catalytic metal or alloy is provided on the nanoparticles. For example, a composition of a substrate bearing nanoparticles (coated with an ionomer, or not) can be coated with a thin film (continuous, or not) comprising a platinum alloy. The thin film can include non-continuous islands (isolated thin film surfaces) ranging in thickness from about 5 Å to about 100 Å and/or ranging in area from about 1 $nm^2$ to about $10^4$ $nm^2$. The film can be Pt or include an alloy of one or more metals, such as, e.g., Co, Ni, Mo, Ta, Ru, W, Zr, and/or the like, described herein with regard to other electrodes of the invention.

The present invention includes vapor deposition systems (physical or chemical) for efficiently preparing, e.g., fuel cell electrodes of the invention. A multi-chamber system, sometimes called a linear or cluster system, can be assembled for producing multiple targets in a single run. Such a vapor deposition system can include a plurality of substrates and a plurality of vapor deposition chambers. A drive mechanism can be provided to transport one or more of the substrates between two or more of the vapor deposition chambers so that at least one substrate can experience more than one vapor deposition treatment in the same system without breaking the system vacuum or having to manually transfer the substrate between deposition chambers. Thus, one or more materials can be deposited on the one or more substrates in each of the two or more deposition chambers.

The multi-chamber vapor deposition system can include two or more vapor deposition chambers. The multi-chamber vapor deposition system can include three or more, four or more, or five or more vapor deposition chambers. In a preferred embodiment, the system includes three vapor deposition chambers, e.g., a first physical vapor deposition (PVD) chamber to deposit metal onto a substrate to act as "seed" sites for subsequent carbon nanotube growth, a chemical vapor deposition (CVD) chamber configured for growth of carbon nanotubes, and a second PVD chamber for deposition of metal catalyst material onto the nanotubes, e.g., thus, forming a fuel cell electrode. For example, the system can include a PVD chamber comprising a Ni target, a CVD chamber configured to grow carbon nanotubes, and a PVD chamber comprising a Pt target. Between chambers of the system there can be one or more valves (e.g., doors, slit valves, or the like) between two or more chambers. The valves can be simply movable shields to prevent over spray of deposition materials between chambers or can be hermetically sealable to allow individual chambers to have different desired conditions of temperature, pressure, gas composition, etc. The multi-chambered system can be capable of serial and/or parallel processing of electrodes.

The systems can include heaters or cooling systems to control temperatures of the substrates within the chambers. For example, a chamber for deposition of Ni nanotube seed material onto a substrate can include a heater capable of heating the substrate to a temperature ranging from about 50° C. to about 800° C., from about 100° C. to about 300° C., or about 200° C. Such a heater can be, e.g., a radiant heater or an ohmic heater that provides electric current to generate resistive heat directly within a substrate.

The multi-chamber vapor deposition system can include one or more substrate loadlock stations, e.g., to hold unprocessed substrates, to hold partially processed substrates, and/or to hold completed electrodes. The load stations can be multi-pallet loadlock stations with holding locations for two or more substrates. In a preferred embodiment, the system includes at least two multi-pallet loadlock stations: one capable of holding two or more unprocessed substrates and one for receiving the product of two or more vapor deposition processes. The loadlock stations typically interact with a drive mechanism that can move substrates to and/or from the stations and among vapor deposition chambers for processing, as desired. Typical drive mechanisms include, robotic arms, conveyor belts, moving rods, carousels, and the like.

In certain embodiments, at least one deposition chamber of the system includes two or more deposition source targets. For example, a chamber of the system can have two metal ion (plasma) source targets, e.g., to allow a choice of metal depositions in the chamber, deposition of metal alloy combinations, or deposition material gradients. Such systems can be provided with a transfer belt that can move a substrate for sequential exposure to plasma from the two or more electrodes in turn or to promote even deposition of the two materials across the substrate surface.

In certain embodiments of the compositions, systems or fuel cell electrodes, the catalytic metal on the electrode comprises an alloy. For example, the alloy can be a combination of platinum (Pt), vanadium (V), and one or more metals selected from the group consisting of Co, Ni, Mo, Ta, W, and Zr, more typically selected from the group consisting of Co, and Ni. In certain embodiments, platinum comprises up to about 12%, 25%, or 50% (mole ratio or atomic percentage) of the alloy. In certain embodiments, the alloy contains platinum, vanadium, nickel, and copper. In certain embodiments, the thin film comprises an alloy having the formula: $Pt_xV_yCo_zNi_w$, where x is greater than 0.06 and less than 1; y, z, and w are independently greater than zero and less than 1; and $x+y+z+w=1$. In certain embodiments, x is 0.12. In certain embodiments, x is 0.12, y is 0.07, z is 0.56, and w is 0.25.

Also provided is a fuel cell catalyst comprising a plurality of nanoparticles where the nanoparticles are coated with a substantially continuous catalytically active thin film, e.g., a thin film comprising platinum or a platinum alloy. In certain embodiments, the nanoparticles are nanotubes. The nanotubes can be seeded with one or more nanotube growth catalysts selected from the group consisting of $Fe_xNi_yCo_{1-x-y}$ where $0<x<1$ and $0<y<1$, $Co_{1-x}Mo_x$ where $0\geq x\geq 0.3$, $Co_{1-x-y}Ni_xMo_y$ where $0.1\geq x\geq 0.7$ and $0\geq y\geq 0.3$, $Co_{1-x-y-z}Ni_xV_yCr_z$ where $0\leq x\leq 0.7$ and $0\leq y\leq 0.2$, $0\leq z\leq 0.2$, $Ni_{1-x-y}Mo_xAl_y$ where $0\leq x\leq 0.2$ and $0\geq y\geq 0.2$, and $Co_{1-x-y}Ni_xAl_y$ where $0\leq x\leq 0.7$ and $0\leq y\leq 0.2$. Particularly preferred nanotube growth catalysts include, but are not limited to $Co_{8.8}Mo_{1.2}$, $Co_{2.2}Ni_{5.6}Mo_{2.2}$, $Co_{5.7}Ni_{2.1}Cr_{1.1}$, $Ni_{8.0}Mo_{1.0}Al_{1.0}$, and $Co_{6.4}Ni_{2.4}Al_{1.2}$. In various embodiments, the nanotubes have a length less than 50 μm and/or a width/diameter less than about 100 nm or less than about 50 nm. The thin film can partially or completely cover the nanoparticles and, in certain embodiments, ranges in thickness from about 1 to about 1000 angstroms, more typically from about 5 to about 100 or 500 angstroms.

In certain embodiments, the thin film comprises an alloy comprising platinum (Pt), vanadium (V), and one or more metals selected from the group consisting of Co, Ni, Mo, Ta, W, and Zr, more typically selected from the group consisting of Co, and Ni. In certain embodiments, platinum comprises up to about 12%, 25%, or 50% (mole ratio or atomic percentage) of the alloy. In certain embodiments, the alloy contains platinum, vanadium, nickel, and copper. In certain embodiments, the thin film comprises an alloy having the formula: $Pt_xV_yCo_zNi_w$, where x is greater than 0.06 and less than 1; y, z, and w are independently greater than zero and less than 1; and $x+y+z+w=1$. In certain embodiments, x is 0.12. In certain embodiments, x is 0.12, y is 0.07, z is 0.56, and w is 0.25. In certain embodiments, the nanoparticles are attached, or incorporated into, a substrate (e.g., a porous carbon substrate, a polymer substrate, carbon paper, etc.). The nanoparticles can be electrically coupled to an electrode. In certain embodiments, the nanoparticles are selected from the group consisting of nanotubes, nanofibers, nanohorns, nanopowders, nanospheres, and quantum dots. In certain embodiments, the nanoparticles are carbon nanotubes seeded with one or more catalysts selected from the group consisting of $Fe_xNi_yCo_{1-x-y}$ where $0<x<1$ and $0<y<1$, $Co_{1-x}Mo_x$ where $0\leq x\leq 0.3$, $Co_{1-x-y}Ni_xMo_y$, where $0.1\leq x\leq 0.7$ and $0\leq y\leq 0.3$, $Co_{1-x-y-z}Ni_xV_yCr_z$ where $0\leq x\leq 0.7$ and $0\leq y\leq 0.2$, $0\leq z\leq 0.2$, $Ni_{1-x-y}Mo_xAl_y$ where $0\leq x\leq 0.2$ and $0\leq y\leq 0.2$, and $Co_{1-x-y}Ni_xAl_y$ where $0\leq x\leq 0.7$ and $0\leq y\leq 0.2$. In certain embodiments, the nanoparticles are carbon nanotubes seeded with one or more catalysts selected from the group consisting of $Co_{8.8}Mo_{1.2}$, $Co_{2.2}Ni_{5.6}Mo_{2.2}$, $Co_{5.7}Ni_{2.1}V_{1.1}Cr_{1.1}$, $Ni_{8.0}Mo_{1.0}Al_{1.0}$, and $Co_{6.4}Ni_{2.4}Al_{1.2}$. In certain embodiments, the nanoparticles are nanotubes having a length less than about 500 μm and a width less than about 100 nm. In certain embodiments, the nanoparticles are nanotubes having a diameter of about 10 nm to about 100 nm.

In still another embodiment, this invention provides an electrode-membrane combination comprising: at least a first conductive electrode comprising a first fuel cell catalyst; at least a second conductive electrode comprising a second fuel cell catalyst; and a proton exchange membrane separating the first conductive electrode and the second conductive electrode; where the first fuel cell catalyst and the second fuel cell catalyst are independently selected catalysts as described herein (e.g. a plurality of nanoparticles where the nanoparticles are coated with a substantially continuous catalytically active thin film, e.g., a substantially contiguous thin film comprising platinum or a platinum alloy). The first fuel cell catalyst and the second fuel cell catalyst can comprise the same or different nanoparticles and/or the same or different catalytically active thin films. In certain embodiments, the proton exchange membrane has a thickness ranging from about 2 μm to about 100 μm. Suitable proton exchange membranes include, but are not limited to Nafion®, silicon oxide/Nafion composite, polyphosphazenes, sulfonated poly(2,6-dimethyl-1,4-phenylene oxide) (PPO), silica-polymer composites, and the like. In certain embodiments, the first conductive electrode and the first fuel cell catalyst form separate layers. In certain embodiments, the first conductive layer and first fuel cell catalyst further include a microdiffusion layer between the electrode and the catalyst. In certain embodiments, the first conductive electrode and the first fuel cell catalyst form an integral single layer (e.g., an IGEC). Thus, in certain embodiments, the first fuel cell catalyst can additionally act as a microdiffusion layer. In certain embodiments, the second conductive layer and second fuel cell catalyst further include a microdiffusion layer between the electrode and the catalyst. In certain embodiments, the second conductive electrode and the second fuel cell catalyst form an integral single layer (e.g., an IGEC). Thus, in certain embodiments, the second fuel cell catalyst can additionally act as a microdiffusion layer.

This invention also provides a fuel cell stack comprising a plurality of electrically connected electrode membrane combinations (membrane electrode assembly (MEAs) as described herein. Also included are electrical devices comprising one or more such fuel cell stacks. In addition, this invention provides a battery replacement where the battery replacement comprises a container containing a fuel cell stack as described herein, and where the container provides a positive electrode terminal and a negative electrode terminal for contacting to a device requiring electricity. In certain embodiments, the battery replacement powers a home, a vehicle, a cell phone, a lighting system, a computer, and/or an appliance.

In certain embodiments, this invention provides methods of fabricating a fuel catalyst. The methods typically involve providing a plurality of nanoparticles; and depositing on the nanoparticles a substantially continuous catalytically active thin film, e.g. a thin film comprising platinum or a platinum alloy. The depositing can be by any suitable method including but not limited to sputtering deposition, chemical vapor deposition (CVD), molecular beam epitaxy (MBE), plasma-assisted vapor deposition, electroplating, electroless plating, and electron beam evaporation deposition. The film can partially or fully cover the nanoparticles; the film can be contiguous, or not. In certain embodiments, the nanoparticles are nanotubes comprising a nanotube growth catalyst as described herein. The thin film typically includes any of the metals or metal alloys described herein and typically ranges in thickness as described herein. The nanoparticles can be provided attached to a substrate (e.g., one or more carbon fibers, a porous carbon substrate, a porous electrode, etc.). Suitable nanoparticles, include, but are not limited to nanotubes, nanofibers, nanohorns, nanopowders, nanospheres, and quantum dots. In certain preferred embodiments, the nanoparticles are carbon nanotubes as described herein.

This invention also provides methods of preparing a fuel cell element. The method typically involves providing a plurality of fibers and/or a porous electrode material; depositing a nanoparticle catalyst on the plurality of fibers and/or porous electrode material; forming nanoparticles on the plurality of fibers and/or porous electrode material using the nanoparticles catalyst; and forming a catalytically active layer comprising a substantially continuous thin film on the nanoparticles, thereby forming a fuel cell element comprising a plurality of fibers bearing nanoparticles partially or fully coated with a catalytically active thin film. In certain embodiments, the plurality of fibers comprises a plurality of carbon fibers (e.g., a carbon fiber paper or other porous carbon electrode). In certain embodiments, the nanoparticle catalyst is a carbon nanotube catalyst, e.g. as described herein, and/or the nanoparticles are carbon nanotubes, e.g., as described herein and/or the substantially continuous thin film is a catalytically active thin film, e.g., as described herein. In certain embodiments, the nanoparticles are formed by chemical vapor deposition (CVD). In certain embodiments, the depositing a nanoparticle catalyst comprises depositing the catalyst on fibers by chemical vapor deposition (CVD). In certain preferred embodiments, the nanotube growth catalyst is a catalyst selected from the group consisting of $Co_{1-x}Mo_x$ where $0 \leq x \leq 0.3$, $Co_{1-x-y}Ni_xMo_y$ where $0.1 \leq x \leq 0.7$ and $0 \leq y \leq 0.3$, $Co_{1-x-y-z}Ni_xV_yCr_z$ where $0 \leq x \leq 0.7$ and $0 \leq y \leq 0.2$, $0 \leq z \leq 0.2$, $Ni_{1-x-y}Mo_xAl_y$ where $0 \leq x \leq 0.2$ and $0 \leq y \leq 0.2$, and $Co_{1-x-y}Ni_xAl_y$ where $0 \leq x \geq 0.7$ and $0 \geq y \geq 0.2$. Certain suitable catalysts include, but are not limited to $Co_{8.8}Mo_{1.2}$, $Co_{2.2}Ni_{5.6}Mo_{2.2}$, $Co_{5.7}Ni_{2.1}V_{1.1}Cr_{1.1}$, $Ni_{8.0}Mo_{1.0}Al_{1.0}$, and $Co_{6.4}Ni_{2.4}Al_{1.2}$. In certain providing a plurality of fibers and/or a porous electrode material comprises providing a carbon fiber paper; depositing a nanoparticle catalyst comprises depositing said catalyst by chemical vapor deposition; forming nanoparticles comprises forming carbon nanotubes; and forming a catalytically active layer comprising depositing a substantially continuous thin film comprising platinum or a platinum alloy.

This invention also provides a method of making a carbon nanotube for use in a fuel cell. The method typically involves providing a nanotube growth catalyst selected from the group consisting of $Fe_xNi_yCo_{1-x-y}$ where $0<x<1$ and $0<y<1$, $Co_{1-x}Mo_x$ where $0 \leq x \leq 0.3$, $Co_{1-x-y}Ni_xMo_y$ where $0.1 \leq x \leq 0.7$ and $0 \leq y \leq 0.3$, $Co_{1-x-y-z}Ni_xV_yCr_z$ where $0 \leq x \leq 0.7$ and $0 \leq y \leq 0.2$, $0 \leq z \leq 0.2$, $Ni_{1-x-y}Mo_xAl_y$ where $0 \leq x \leq 0.2$ and $0 \leq y \leq 0.2$, and $Co_{1-x-y}Ni_xAl_y$ where $0 \leq x \leq 0.7$ and $0 \leq y \leq 0.2$; and forming a carbon nanotube on said catalyst (e.g. by CVD). In certain embodiments, the catalyst is a catalyst selected from the group consisting of $Co_{8.8}Mo_{1.2}$, $Co_{2.2}Ni_{5.6}Mo_{2.2}$, $Co_{5.7}Ni_{2.1}V_{1.1}Cr_{1.1}$, $Ni_{8.0}Mo_{1.0}Al_{1.0}$, and $Co_{6.4}Ni_{2.4}Al_{1.2}$. In certain embodiments, the carbon nanotubes are grown on a porous conductive substrate (e.g., ultimately a gas diffusion membrane).

Also provided is a carbon nanotube comprising a nanotube growth catalyst selected from the group consisting of $Fe_xNi_yCo_{1-x-y}$ where $0<x<1$ and $0<y<1$, $Co_{1-x}Mo_x$ where $0 \leq x \leq 0.3$, $Co_{1-x-y}Ni_xMo_y$ where $0.1 \leq x \leq 0.7$ and $0 \leq y \leq 0.3$, $Co_{1-x-y-z}Ni_xV_yCr_z$ where $0 \leq x \leq 0.7$ and $0 \leq y \leq 0.2$, $0 \leq z \leq 0.2$, $Ni_{1-x-y}Mo_xAl_y$ where $0 \leq x \leq 0.2$ and $0 \leq y \leq 0.2$, and $Co_{1-x-y}Ni_xAl_y$ where $0 \leq x \leq 0.7$ and $0 \leq y \leq 0.2$. In certain embodiments, the catalyst is a catalyst selected from the group consisting of $Co_{8.8}Mo_{1.2}$, $Co_{2.2}Ni_{5.6}Mo_{2.2}$, $Co_{5.7}Ni_{2.1}V_{1.1}Cr_{1.1}$, $Ni_{8.0}Mo_{1.0}Al_{1.0}$, and $Co_{6.4}Ni_{2.4}Al_{1.2}$.

Carbon nanotube growth catalysts (e.g., for growing carbon nanotubes for use in a fuel cell) are also provided. Preferred catalysts include catalysts selected from the group consisting of $Fe_xNi_yCo_{1-x-y}$ where $0<x<1$ and $0<y<1$, $Co_{1-x}Mo_x$ where $0 \leq x \leq 0.3$, $Co_{1-x-y}Ni_xMo_y$ where $0.1 \leq x \leq 0.7$ and $0 \leq y \leq 0.3$, $Co_{1-x-y-z}Ni_xV_yCr_z$ where $0 \leq x \leq 0.7$ and $0 \leq y \leq 0.2$, $Ni_{1-x-y}Mo_xAl_y$ where $0 \leq x \leq 0.2$ and $0 \leq y \leq 0.2$, and $Co_{1-x-y}Ni_xAl_y$ where $0 \leq x \leq 0.7$ and $0 \leq y \leq 0.2$. In certain embodiments, the catalyst is selected from the group consisting of $Co_{8.8}Mo_{1.2}$, $Co_{2.2}Ni_{5.6}Mo_{2.2}$, $Co_{5.7}Ni_{2.1}V_{1.1}Cr_{1.1}$, $Ni_{8.0}Mo_{1.0}Al_{1.0}$, and $Co_{6.4}Ni_{2.4}Al_{1.2}$.

DEFINITIONS

The term "nanoparticles", as used herein refers to a particle having at least one dimension equal to or smaller than about 500 nm, preferably equal to or smaller than about 100 nm, more preferably equal to or smaller than about 50 or 20 nm, or having a crystallite size of about 10 nm or less, as measured from electron microscope images and/or diffraction peak half widths of standard 2-theta x-ray diffraction scans.

The terms "membrane electrode assembly (MEA)" and "membrane electrode combination" are used interchangeably and typically refer at least two electrodes separated by a PEM.

The term "electrically coupled" when referring to nanoparticles and an electrode refers to a coupling by which electrons or protons are capable of passing from the nanoparticles to the electrode or vice versa. The electrical coupling need not require actual physical contact between the nanoparticles and electrode. Thus electrical coupling includes, but is not limited to direct electron conduction, electron tunneling, inductive coupling, and the like.

The term "substantially continuous" when used with respect to "nanoparticles coated with a substantially continuous thin film" refers to a film that forms a substantially contiguous coating where formed on the nanoparticles. This is in contrast to a film that appears clumped or globular. The coating does not appear patchy or variegated. In certain embodiments, the film is substantially continuous over at least 20%, preferably substantially continuous over at least 30% or 40%, more preferably substantially continuous over at least 50% or 60% and most preferably substantially continuous over at least 70% or 80% of the surface of the nanoparticles.

The term "bearing" when used with reference to a substrate bearing nanoparticles, refers to nanoparticles adsorbed to the substrate, and/or chemically bonded (e.g., ionically, hydrophobically, covalently) to the substrate, and/or interleaved in interstices within or between fibers of the substrate.

The term "integrated gas-diffusion/electrode/catalyst (IGEC)" refers to a porous (gas diffusion electrode) comprising nanoparticles partially or fully covered with a substantially continuous catalytically active thin film (e.g. a platinum or platinum alloy thin film). In certain embodiments the IGEC also acts as an integral microdiffusion device.

The term fuel-cell element refers to an integral element comprising an electrode that can be used in the construction of a fuel cell. In certain embodiments, the fuel-cell element is an IGEC.

The term "fuel cell catalyst" can refer to a catalytically active material (e.g. platinum or platinum alloy) for use in a fuel cell or to nanoparticles coated with a thin film of the catalytically active material. Thus, for example, in certain embodiments, the fuel cell catalyst comprises a plurality of nanoparticles said nanoparticles coated with a substantially continuous thin film comprising platinum or a platinum alloy. The particular usage will be clear from context.

The term "nanoparticles catalyst" refers to a material that acts as a catalyst and/or nucleation point, and/or "seed" for starting and/or guiding the formation of a nanoparticles.

A "catalytically active thin film" refers to a thin film capable of catalyzing one or more of the chemical reactions that occur in a fuel cell. In certain embodiments, the catalytically active thin film comprises platinum or a platinum alloy.

An "ionomer" refers to a polymer with covalently bound ionic groups. The ionomer can be a synthetic polymer, such as a poly(ethylene-co-methacrylic acid) or a perfluorosulfonate. The ionomer can be a polymer of ionic subunits; a copolymer of ionic subunits or mixed ionic and nonionic subunits; a block polymer; or a block copolymer. The ionomer can be a biological polymer, such as a nucleic acid or a peptide. In many cases, the ionomer of the invention is not a biological polymer.

BRIEF DESCRIPTION OF THE DRAWINGS

FIG. 3A shows the load current of micro fuel cells as a function of Pt concentration in alloy catalysts of $Pt_xV_{1-x}$. The oxidation effect of $Pt_xV_{1-x}$ catalysts identified as V/Pt—O is compared for its stability. The tests were performed for catalysts on both cathode and anode sides. The micro fuel cells were fabricated by thermal pressing three layers of PtRu commercial electrode (from ElectroChem), Nafion 117, and Pt—V catalyst deposited on TORAY® carbon paper. Each test was performed on 0.785 mm$^2$ area. FIG. 3B shows the load current of micro fuel cells as a function of Pt concentration in alloy catalysts of $Pt_xCo_{1-x}$. The oxidation effect of $Pt_xCo_{1-x}$ catalysts identified as Co/Pt—O is compared for its stability. The tests were performed for catalysts on both cathode and anode sides.

FIG. 6A shows fuel cell voltage plotted as a function of output current per mg Pt content in the catalysts. Three samples compared are (1) a standard assembled three-layer fuel cell purchased from ElectroChem with 1 mg/cm$^2$ Pt catalysts, (2) $Pt_{0.12}Co_{0.88}$ thin film catalyst directly coated on carbon fiber paper, and (3) $Pt_{0.12}Co_{0.88}$ thin film catalyst coated on carbon nanotubes which are directly grown on carbon fiber paper. FIG. 6B shows fuel cell power per mg Pt content in the catalysts plots as a function of output current. Three samples compared are (1) a standard assembled three-layer fuel cell purchased from ElectroChem with 1 mg/cm$^2$ Pt catalysts, (2) $Pt_{0.12}Co_{0.88}$ thin film catalyst directly coated on carbon fiber paper, and (3) $Pt_{0.12}Co_{0.88}$ thin film catalyst coated on carbon nanotubes which is directly grown on carbon fiber paper.

FIG. 7A shows fuel cell cell voltage plotted as a function of output current per mg Pt content in the catalysts. Three samples compared are (1) a standard assembled three-layer fuel cell purchased from ElectroChem with 1 mg/cm$^2$ Pt catalysts, (2) $Pt_{0.12}Co_{0.88}$ thin film catalyst coated on carbon nanotubes which is directly grown on carbon fiber paper, and (3) $Pt_{0.24}Co_{0.76}$ thin film catalyst coated on carbon nanotubes which is directly grown on carbon fiber paper. FIG. 7B shows fuel cell power per mg Pt content in the catalysts plots as a function of output current. Three samples compared are (1) a standard assembled three-layer fuel cell purchased from ElectroChem with 1 mg/cm$^2$ Pt catalysts, (2) $Pt_{0.12}Co_{0.88}$ thin film catalyst coated on carbon nanotubes which is directly grown on carbon fiber paper, and (3) Pt0.24Co0.76 thin film catalyst coated on carbon nanotubes which are directly grown on carbon fiber paper.

FIG. 8A shows fuel cell voltage plots as a function of output current per mg Pt content in the catalysts. Three samples compared are (1) a standard assembled three-layer fuel cell purchased from ElectroChem with 1 mg/cm2 Pt catalysts, (2) $Pt_{0.12}Co_{0.88}$ thin film catalyst coated on carbon nanotubes which is directly grown on carbon fiber paper with 200 Å Ni catalyst, and (3) $Pt_{0.12}Co_{0.88}$ thin film catalyst coated on carbon nanotubes which is directly grown on carbon fiber paper with 400 Å catalyst. FIG. 8B shows fuel cell power per mg Pt content in the catalysts plots as a function of output current. Three samples compared are (1) a standard assembled three-layer fuel cell purchased from ElectroChem with 1 mg/cm$^2$ Pt catalysts, (2) $Pt_{0.12}Co_{0.88}$ thin film catalyst coated on carbon nanotubes which is directly grown on carbon fiber paper with 200 Å Ni catalyst, and (3) $Pt_{0.12}Co_{0.88}$ thin film catalyst coated on carbon nanotubes which is directly grown on carbon fiber paper with 400 Å Ni catalyst.

FIG. 9A shows fuel cell voltage plots as a function of output current per mg Pt content in the catalysts. Three samples compared are (1) a standard assembled three-layer fuel cell purchased from ElectroChem with 1 mg/cm$^2$ Pt catalysts, (2) $Pt_{0.12}Co_{0.88}$ thin film catalyst coated on carbon nanotubes which is directly grown on carbon fiber paper with 200 Å Co catalyst, and (3) $Pt_{0.12}Co_{0.88}$ thin film catalyst coated on carbon nanotubes which is directly grown on carbon fiber paper with 200 Å Ni catalyst. FIG. 9B shows fuel cell power per mg Pt content in the catalysts plots as a function of output current. Three samples compared are (1) $Pt_{0.12}Co_{0.88}$ thin film catalyst directly coated on carbon fiber paper, (2) $Pt_{0.12}Co_{0.88}$ thin film catalyst coated on carbon nanotubes which is directly grown on carbon fiber paper with 200 Å Co catalyst, and (3) $Pt_{0.12}Co_{0.88}$ thin film catalyst coated on carbon nanotubes which is directly grown on carbon fiber paper with 200 Å Ni catalyst.

DETAILED DESCRIPTION

I. Fuel Cell Catalysts

Figure 1:
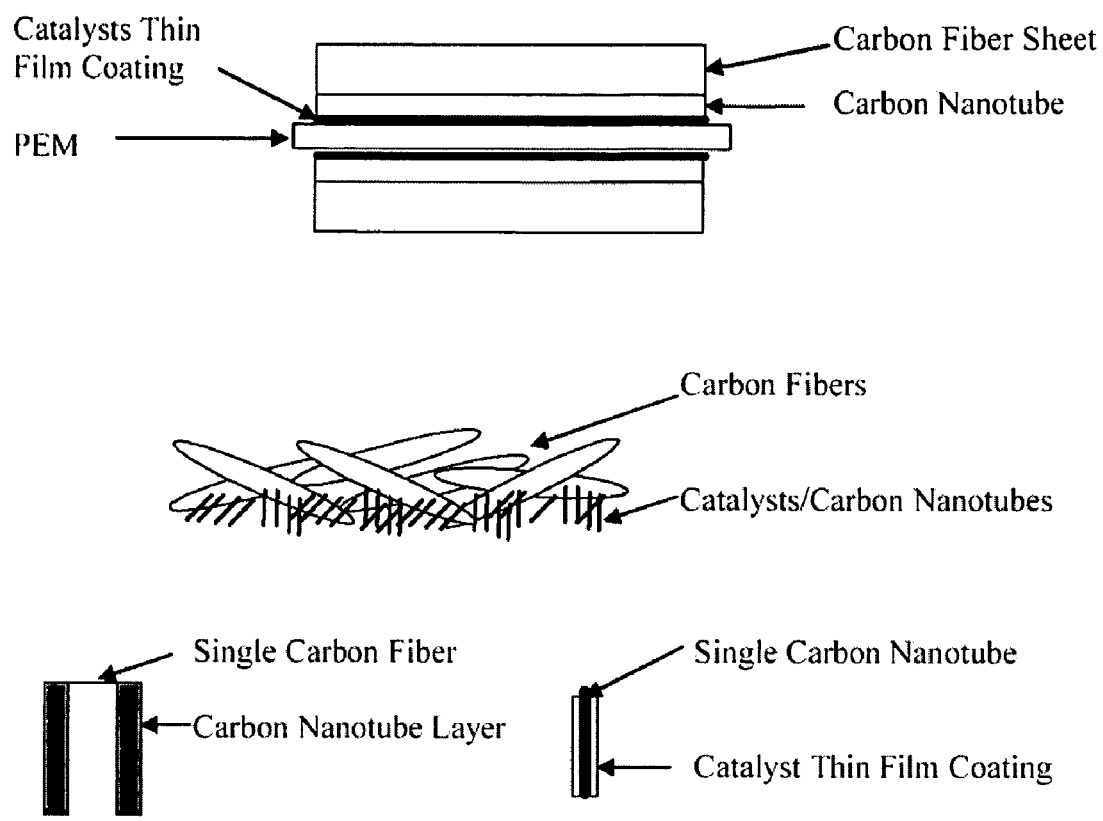
FIG. 1 shows a schematic diagram of a catalyst thin-film/carbon-nanotubes layer/carbon-fiber-sheet detailed structure.

This invention pertains to the development of improved catalysts and integrated gas-diffusion/electrode/catalysts (IGEC) for use in fuel cells. Also provided are fuel cells, fuel cell electrode combinations that utilize the improved catalysts.

In certain embodiments, the catalysts of this invention comprise nanoparticles coated with a substantially continuous thin film comprising a catalytically active metal (e.g. platinum, platinum alloys, etc.). Without being bound to a particular theory, it is believed the catalytic efficiency of the thin film is increased by increasing the effective reactive surface area by depositing the thin film comprising a catalytically active metal or alloy onto nanoparticles. The nanoparticles can be partially coated with the substantially continuous thin film or completely covered with the substantially continuous thin film. In typical embodiments, the thin film ranges in thickness from about 1 nm to about 500 nm, preferably from about 2 nm to about 300 nm, more preferably from about 5 nm to about 100 nm and most preferably from about 10 nm to about 50 nm. In preferred embodiments, the coated areas catalytic material thickness is substantially uniform, e.g., with the thickness varying less than 50%, less than 25%, less than 10%, or less than 5%.

The nanoparticles can include any of a wide range of nanoparticle types. Typical nanoparticles have at least one dimension smaller than about 500 nm, more preferably at least two dimensions or three dimensions each less than about 500 nm. In certain embodiments, the nanoparticles are characterized by at least one dimension smaller than about 100 nm, or 50 nm, or about 10 nm.

Suitable nanoparticles include, but are not limited to various fullerenes, carbon nanotubes, carbon nanohorns, carbon (and other) nanofibers, nano sphere/powder, quantum dots, metal encapsulated fullerenes, and the like. In certain preferred embodiments, the nanoparticles incorporate carbon. Thus, carbon-based nanoparticles including, but not limited to carbon nanotubes, carbon nanohorns, carbon nanofibers, nano sphere/powder, and the like are particularly well suited for use in the catalysts of this invention.

The nanoparticles can take any of a number of possible morphologies and still be suitable for use in the present invention. Thus, for example, this invention contemplates using nanotubes of the following kinds: single-walled, double-walled, multi-walled, with zig-zag chirality, or a mixture of chiralities, twisted, straight, bent, kinked, curled, flattened, and/or round; ropes of nanotubes, twisted nanotubes, braided nanotubes; small bundles of nanotubes (e.g., in certain embodiments, with a number of tubes less than about ten), medium bundles of nanotubes (e.g., in certain embodiments, with a number of tubes in the hundreds), large bundles of nanotubes (e.g. in certain embodiments, with a number of tubes in the thousands); nanotorii, nanocoils, nanorods, nanowires, nanohorns; empty nanocages, filled nanocages, multifaceted nanocages, empty nanococoons, filled nanococoons, multifaceted nanococoons; thin nanoplatelets, thick nanoplatelets, intercalated nanoplatelets, and/or the like. The various nanoparticles (nanostructures) can assume heterogeneous forms. Such heterogeneous forms include, but are not limited to structures, where one part of the structure has a certain chemical composition, while another part of the structure has a different chemical composition. An example is a multi walled nanotube, where the chemical composition of the different walls can be different from each other. Heterogeneous forms also include different forms of nanostructured material, where more than one of the above listed forms are joined into a larger irregular structure. In addition, in certain embodiments any of the above materials can have cracks, dislocations, branches or other impurities and/or imperfections.

Methods of manufacturing nanoparticles are well known to those of skill in the art. Thus, for example, methods for the preparation of carbon nanotubes are described in U.S. Pat. Nos. 6,451,175, 6,713,519, 6,712,864, 6,709,471, and by Hafner et al. (1999) *J. Am. Chem. Soc.,* 121: 9750-9751; Hafner et al. (1999) *Scientific Correspondence* 398: 761-762; and the like. Similarly, the production of nanohorns is described, e.g., by Berber et al. (2000(*Physical Review B,* 62(4): R2291-2294, while the production of nanofibers is described, for example in U.S. Pat. Nos. 6,706,248, 6,485,858, and the like.

In the catalysts of this invention, the nanoparticles are partially or completely covered with a substantially continuous thin film comprising a catalytically active metal or alloy. In certain embodiments, the catalytically active metal or alloy comprises platinum (Pt). Suitable alloys include, but are not limited to binary alloys such as Pt—Cr, Pt—V, Pt—Ta, Pt—Cu, Pt—Ru, Pt—Y, etc., and/or ternary alloys including but not limited to Pt—Ru—Os, Pt—Ni—Co, Pt—Cr—C, Pt—Cr—Ce, Pt—Co—Cr, Pt—Fe—Co, Pt—Ru—Ni, Pt—Ga—Cr—Co, Pt—Ga—Cr—Ni, Pt—Co—Cr, etc., and/or quaternary alloys including, but not limited to Pt—Ni—Co—Mn, Pt—Fe—Co—Cu, etc.

Figure 2:
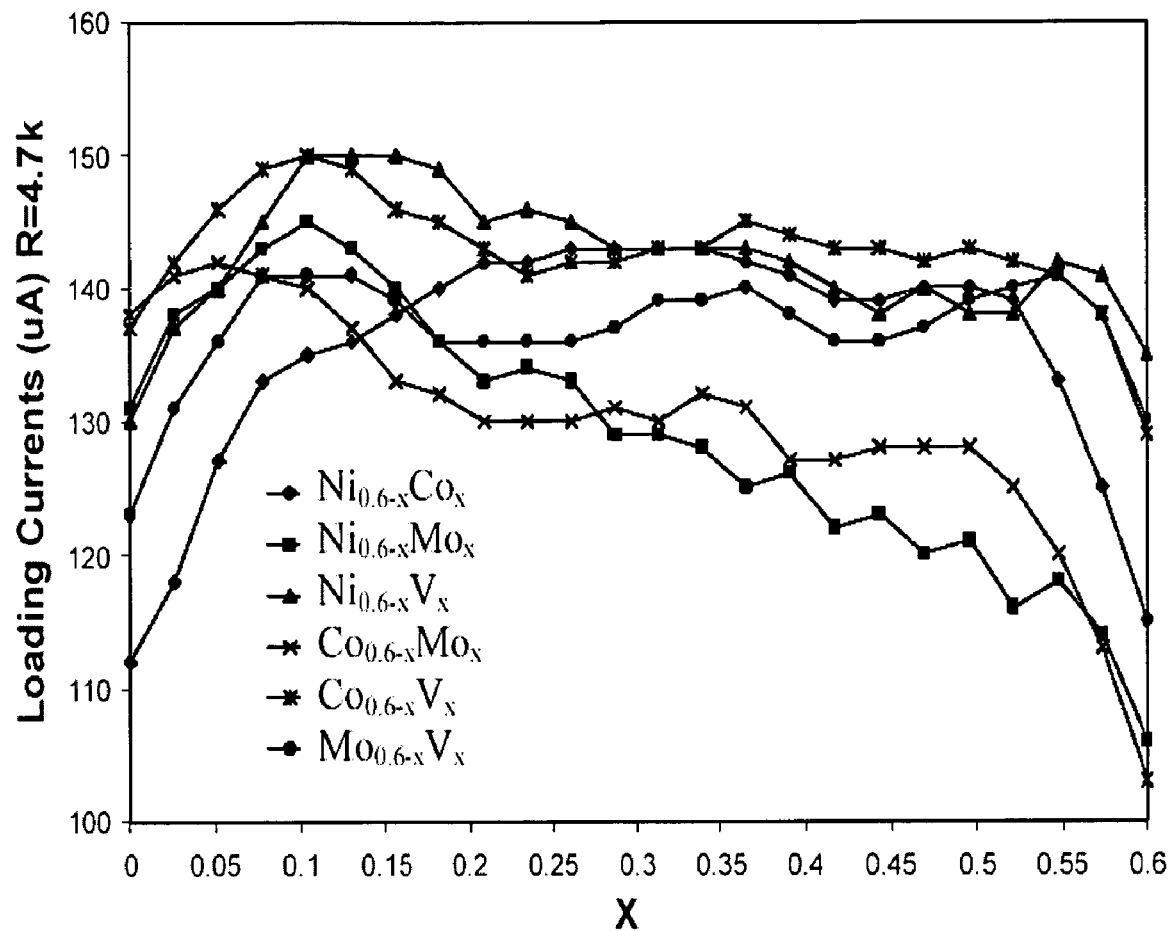
FIG. 2 shows the load current of micro fuel cells as a function of composition of four continuous ternary catalysts of Ni—Co, Ni—Mo, Ni—V, Co—Mo, Co—V and Mo—V at fixed 40% Pt in each alloy system on cathode side. The micro fuel cells were fabricated by thermal pressing three layers of Pt—Ru commercial electrode (from ElectroChem), Nafion 117, and catalyst libraries deposited on TORAY carbon fiber paper. Each test was performed on 0.785 mm$^2$ area.
Figure 3A:
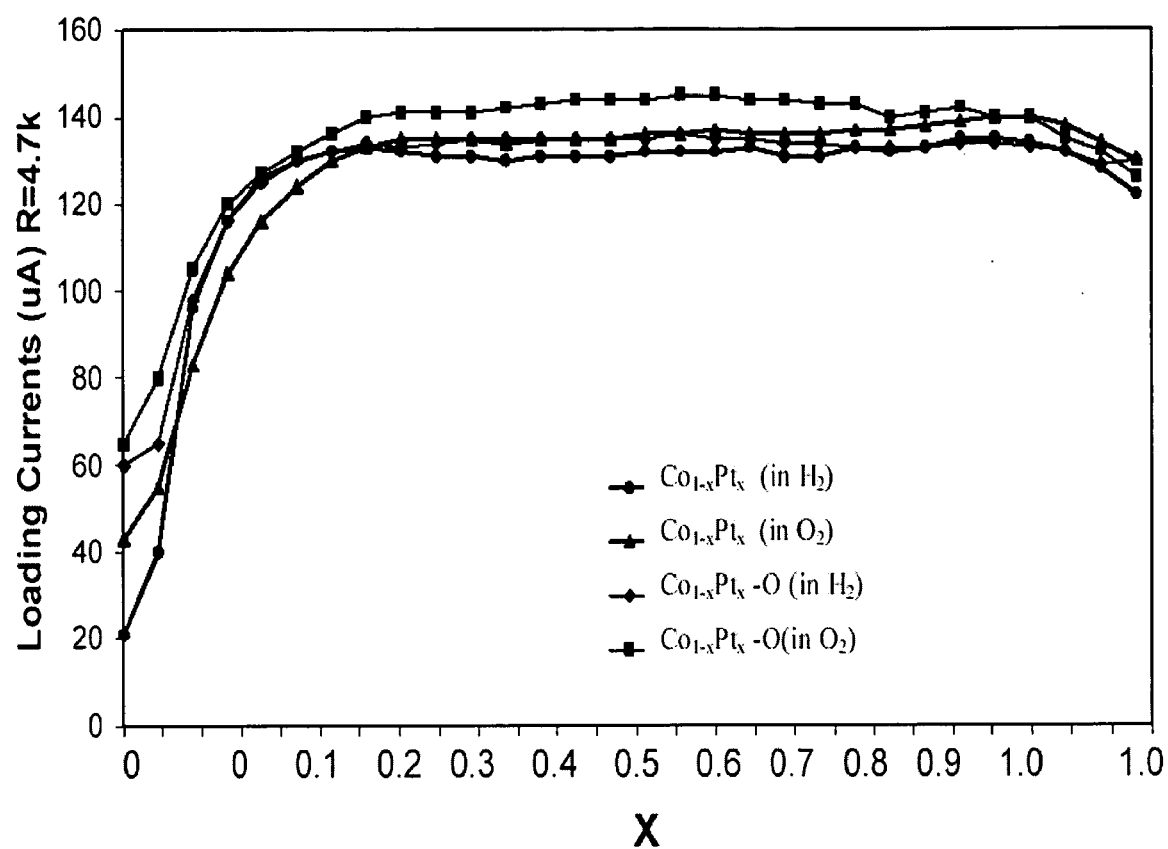
FIGS. 3A and 3B show an example of a micro fuel cell the load current as a function of Pt concentration (proportion) in various platinum alloy catalysts.
Figure 3B:
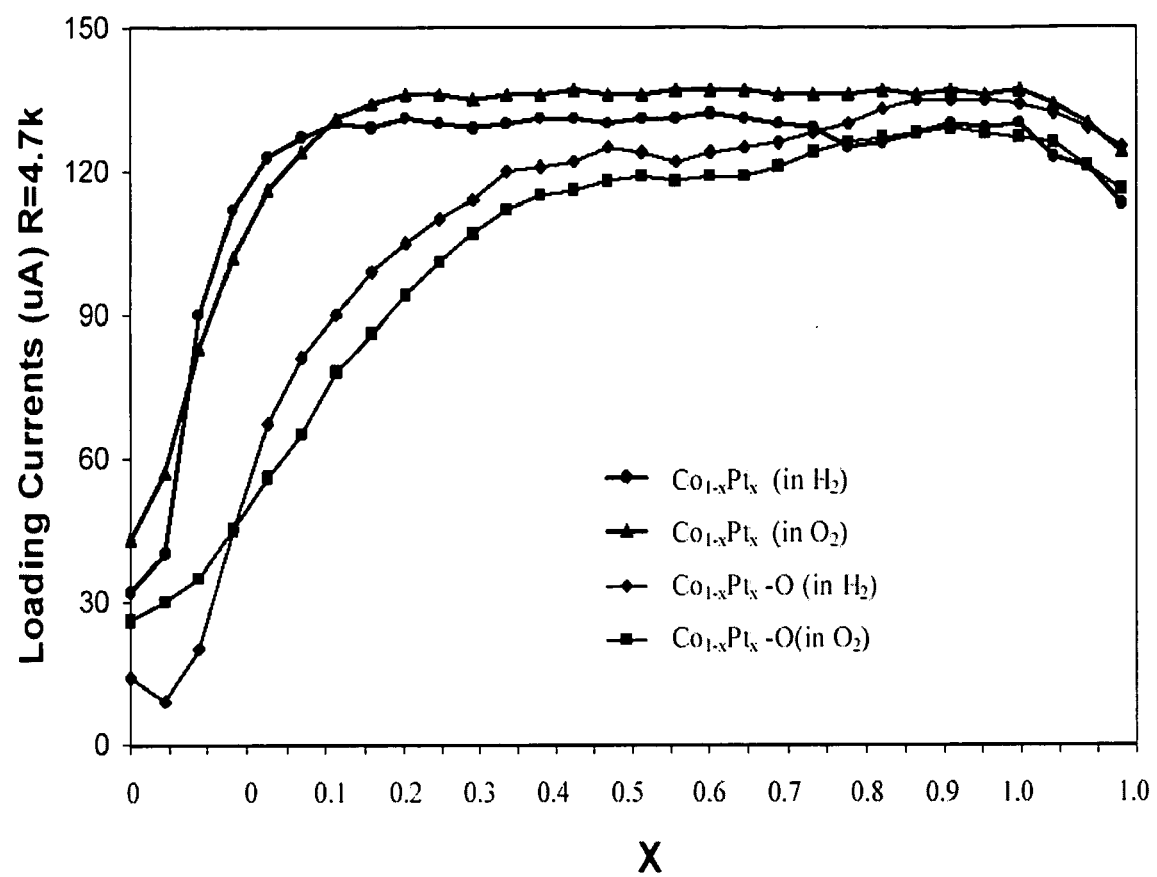
Figure 4:
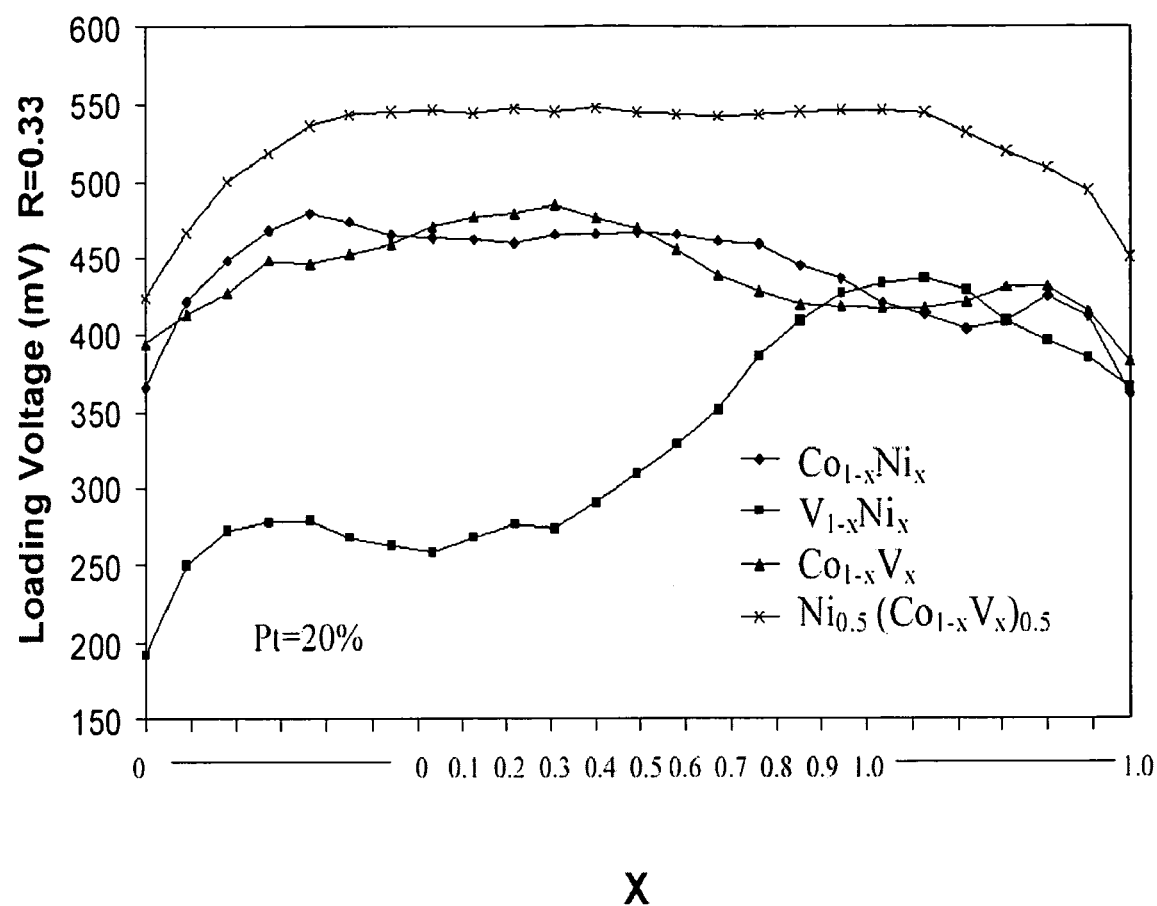
FIG. 4 shows the load voltage of micro fuel cells as a function of composition of four continuous ternary catalysts of Ni—Co, Ni—V, Co—V and quaternary catalyst of Ni0.5 $(Co_{1-x}V_x)_{0.5}$ at fixed 20% Pt in each alloy system on cathode side. The micro fuel cells were fabricated by thermal pressing three layers of Pt—Ru commercial electrode (from ElectroChem), Nafion 117, and catalyst libraries deposited on TORAY carbon fiber paper. Each test was performed on 0.785 mm$^2$ area.

Platinum content per unit area (e.g., per unit surface area of catalyst) is one of the most important cost criteria for practical PEM fuel cell applications. In certain embodiments, binary, ternary and quaternary composition of Pt alloys that contains Co, Ni, Mo and V, are optimized e.g. as illustrated in FIG. 2. Vanadium was found to significantly enhance catalyst oxidation resistance as shown in FIG. 3. Thus, in certain embodiments, the thin film comprises an alloy comprising platinum (Pt) and vanadium (V) and, optionally, one or more additional metals (e.g. Co, Ni, Mo, Ta, W, Zr, etc.). In certain embodiments, a PtNiCoV alloy is a preferred Pt alloy catalyst system for both anode and cathode of PEM fuel cells as shown in FIG. 4.

Platinum (Pt) concentration was also optimized in a platinum alloy system. FIGS. 3A and 3B show that the output current of fuel cell increase quickly as Pt concentrations increase, but the output current saturates at about 12% Pt in both Pt—V and Pt—Co alloy systems. Therefore, in certain embodiments, a preferred platinum concentration in a platinum catalyst alloy is 12% or less for both cathodes and/or anodes of PEM fuel cells.

In certain embodiments, the thin film comprises an alloy having the formula:

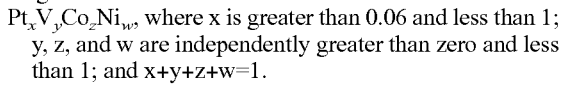

$Pt_xV_yCo_zNi_w$, where x is greater than 0.06 and less than 1; y, z, and w are independently greater than zero and less than 1; and x+y+z+w=1.

Figure 5:
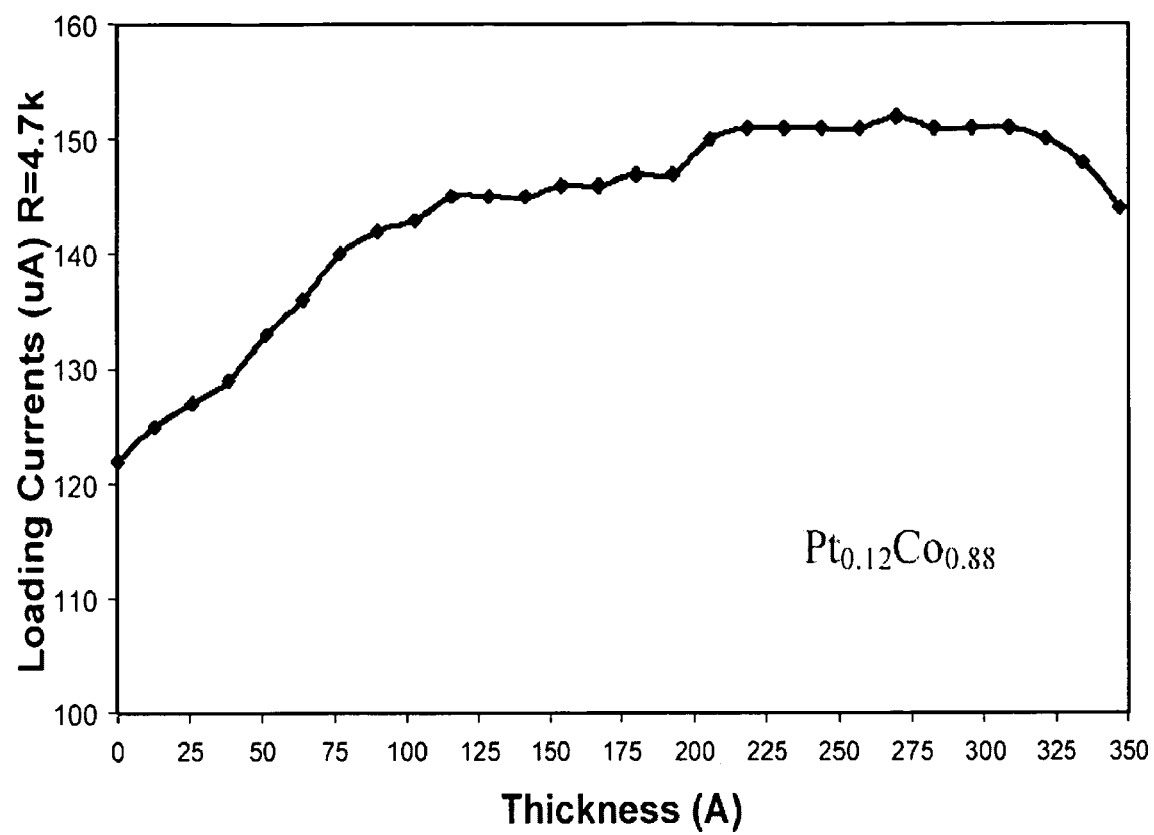
FIG. 5 shows the load current of micro fuel cells as a function of catalyst thickness layer on both cathode and anode sides. The micro fuel cells were fabricated by thermal pressing three layers of Pt—Ru commercial electrode (from ElectroChem), Nafion 117, and catalyst libraries deposited on TORAY carbon fiber paper. Each test was performed on 0.785 mm$^2$ area.

The catalyst layer thickness was also optimized in certain embodiments so as to minimize platinum content. FIG. 5 shows that the current output saturates at a thin film thickness about 100 Å for a catalyst $Pt_{0.12}Co_{0.88}$ alloy. Consequently, in certain preferred embodiments, the thickness of thin film Pt alloy catalysts is 200 Å or less in cathodes and/or anodes of PEM fuel cells.

In certain embodiments, the thin film is not substantially continuous, but rather non-continuous, e.g., non-contiguous or "variegated" to form a plurality of islands/islets on the underlying nanoparticles. In certain instances the film thickness of the islets ranges from about 5 to about 100 angstroms, while the area ranges from about 1 to about $10^4$ nm$^2$.

The thin films can be applied to the nanoparticles by any of a number of convenient methods. In certain embodiments, the thin films can be applied by simple chemical methods. Thus for example, in certain embodiments, the thin film can be applied to the nanoparticles by direct spraying or by exposing the nanoparticles to a solvent containing the thin film materials and allowing the solvent to evaporate away. In certain embodiments, the thin film can be electro-deposited (e.g. electroplated) onto the nanoparticles. In certain other embodiments, the thin film is applied to the nanoparticles by conventional semiconductor processing methods, e.g. sputtering, chemical vapor deposition (CVD), molecular beam epitaxy (MBE), plasma-assisted vapor deposition, electroplating, electroless plating, and the like (see, e.g., Choudhury (1997) *The Handbook of Microlithography, Micromachining, and Microfabrication,* Soc. Photo-Optical Instru. Engineer, Bard & Faulkner (1997) *Fundamentals of Microfabrication,* and the like).

Figure 6A:
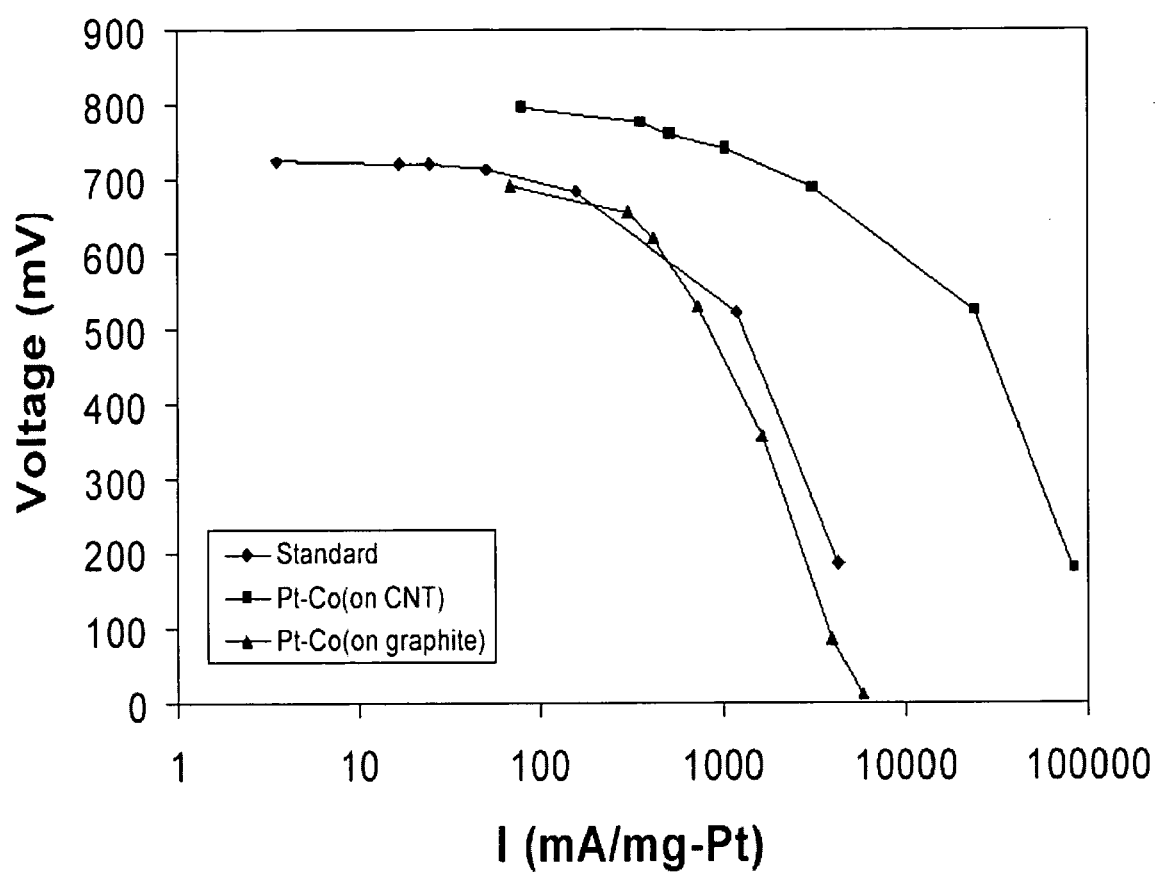
FIGS. 6A and 6B show the effect of nanostructures on the output current of fuel cells.
Figure 6B:
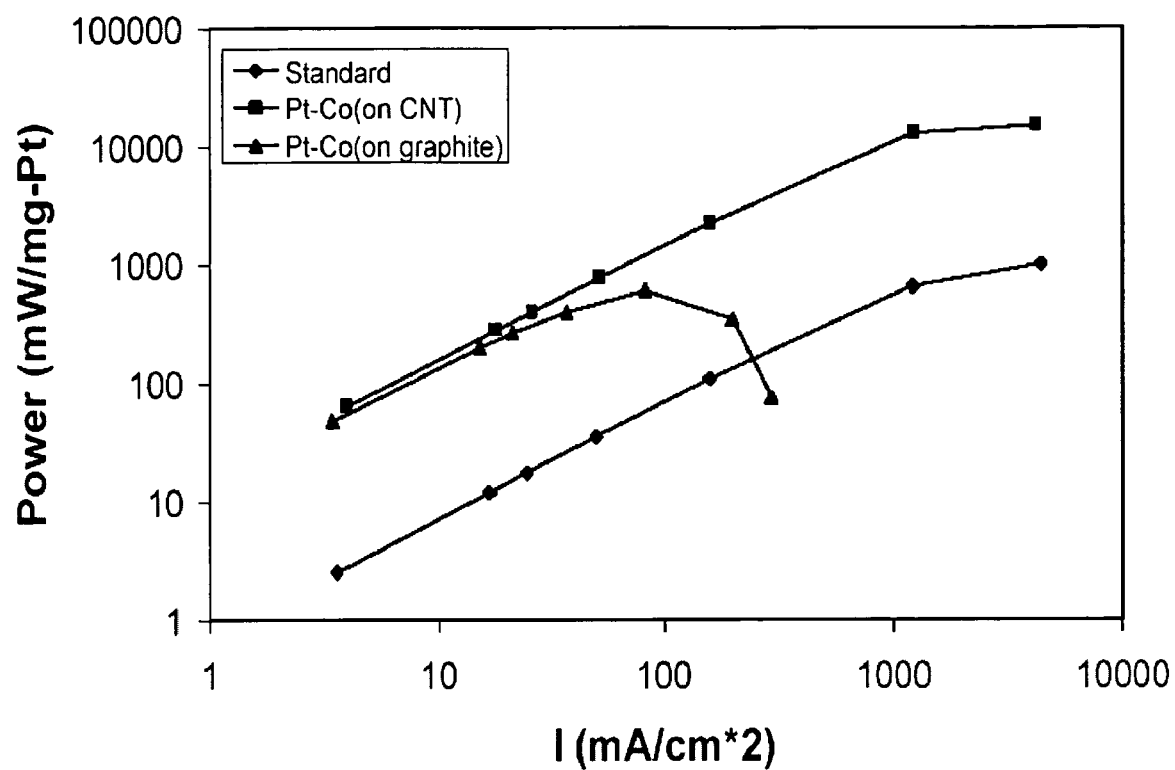
Figure 7A:
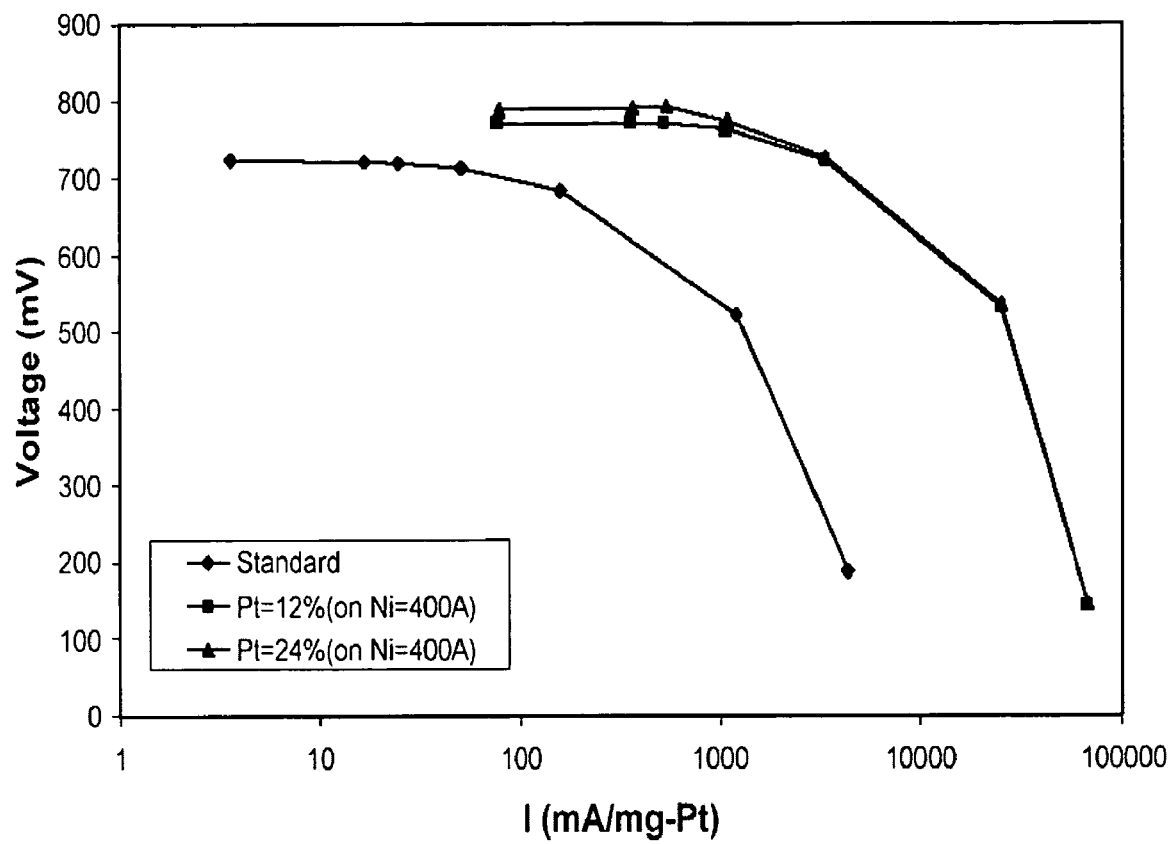
FIGS. 7A and 7B show the effect of platinum content on the power output of fuel cells.
Figure 7B:
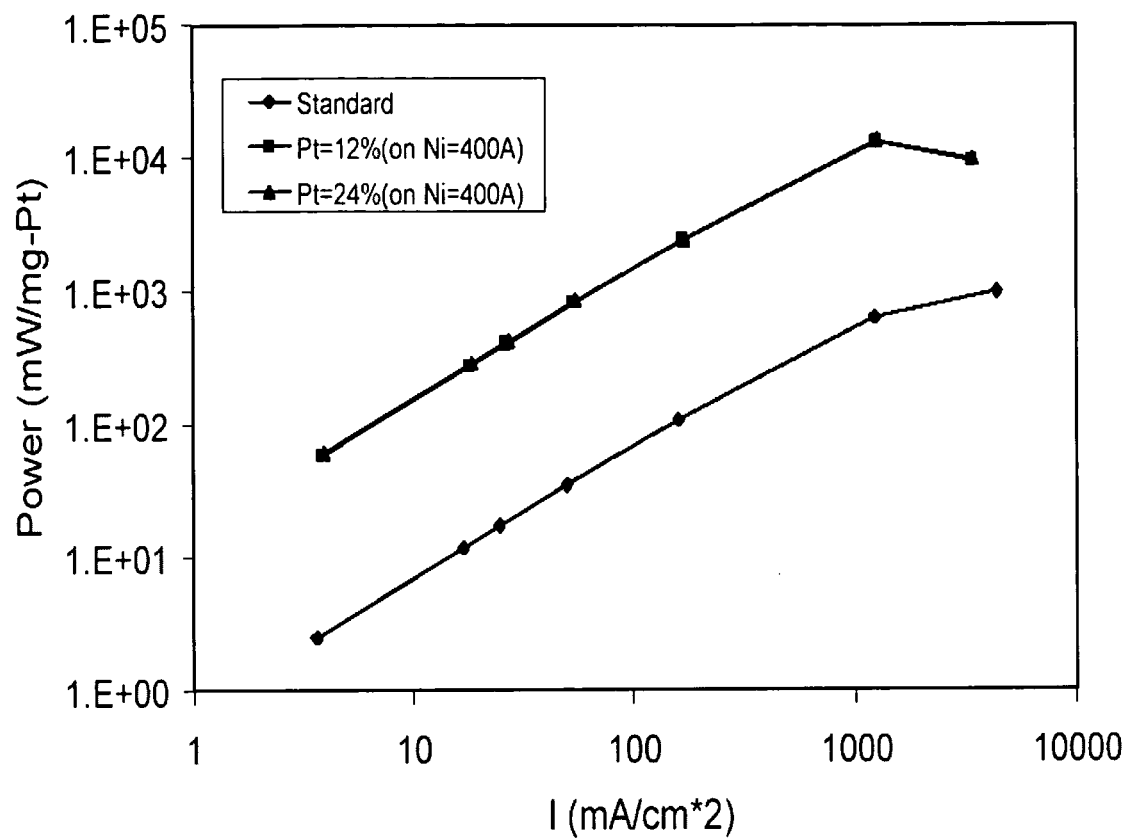

As indicated above, the catalytic efficacy of the thin film is increased by providing the thin film as a substantially continuous thin film on nanoparticles (e.g., carbon nanotubes). For example, FIG. 6A shows that the carbon nanotube supported $Pt_{0.12}Co_{0.88}$ catalysts can increase the output current per mg Pt by one order of magnitude under the same operation voltage. FIG. 6B shows that the carbon nanotube supported $Pt_{0.12}Co_{0.88}$ catalysts can increase the output power per mg Pt by one order of magnitude within the entire current operation range. FIGS. 7A and 7B again confirms that 12% Pt is sufficient for carbon nanotube supported Pt alloy catalysts.

Figure 8A:
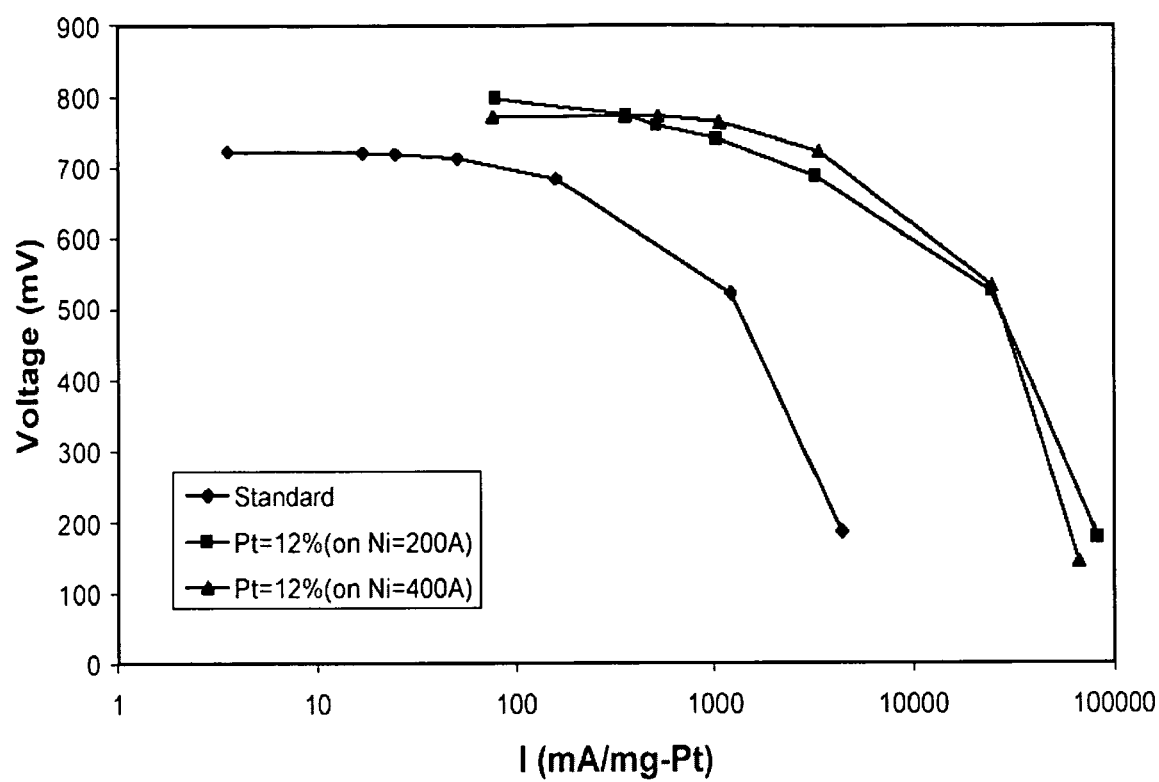
FIGS. 8A and 8B show power output of fuel cells.
Figure 8B:
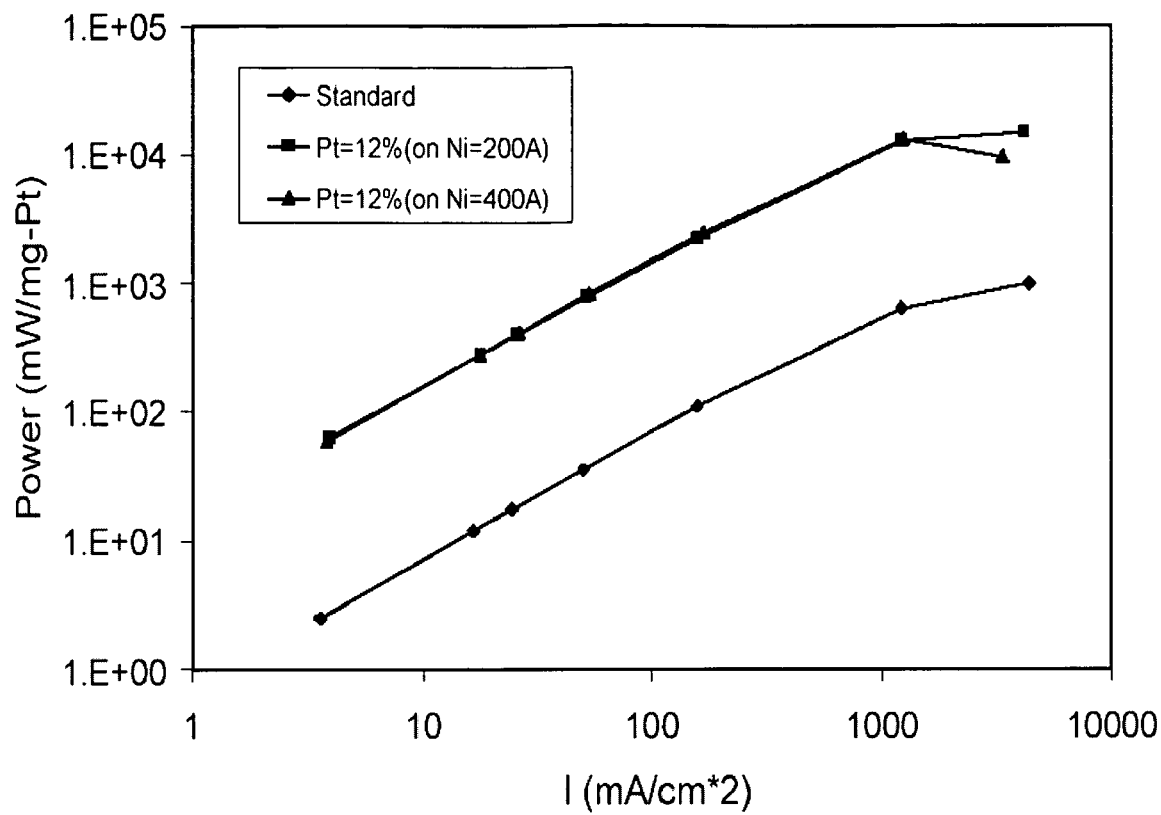
Figure 9A:
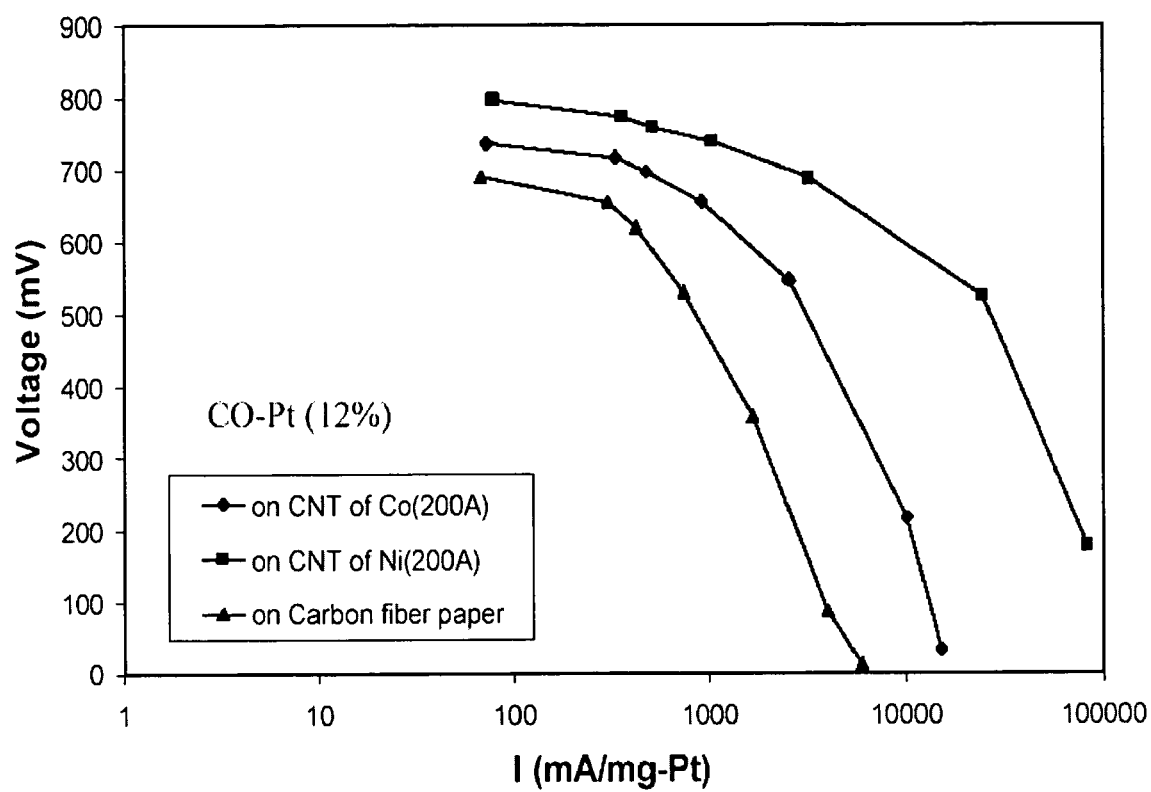
FIGS. 9A 9B show the effect of nanostructures on fuel cell output.
Figure 9B:
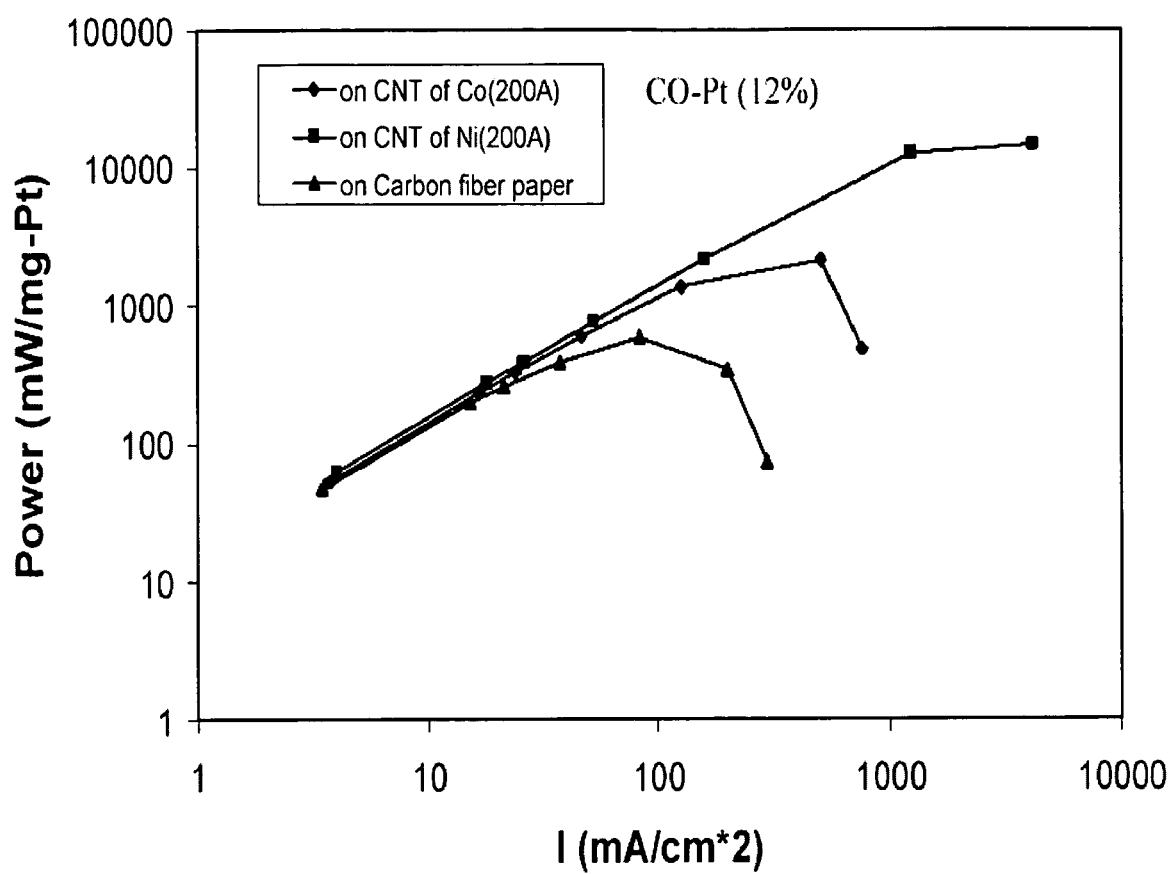
Figure 13A:
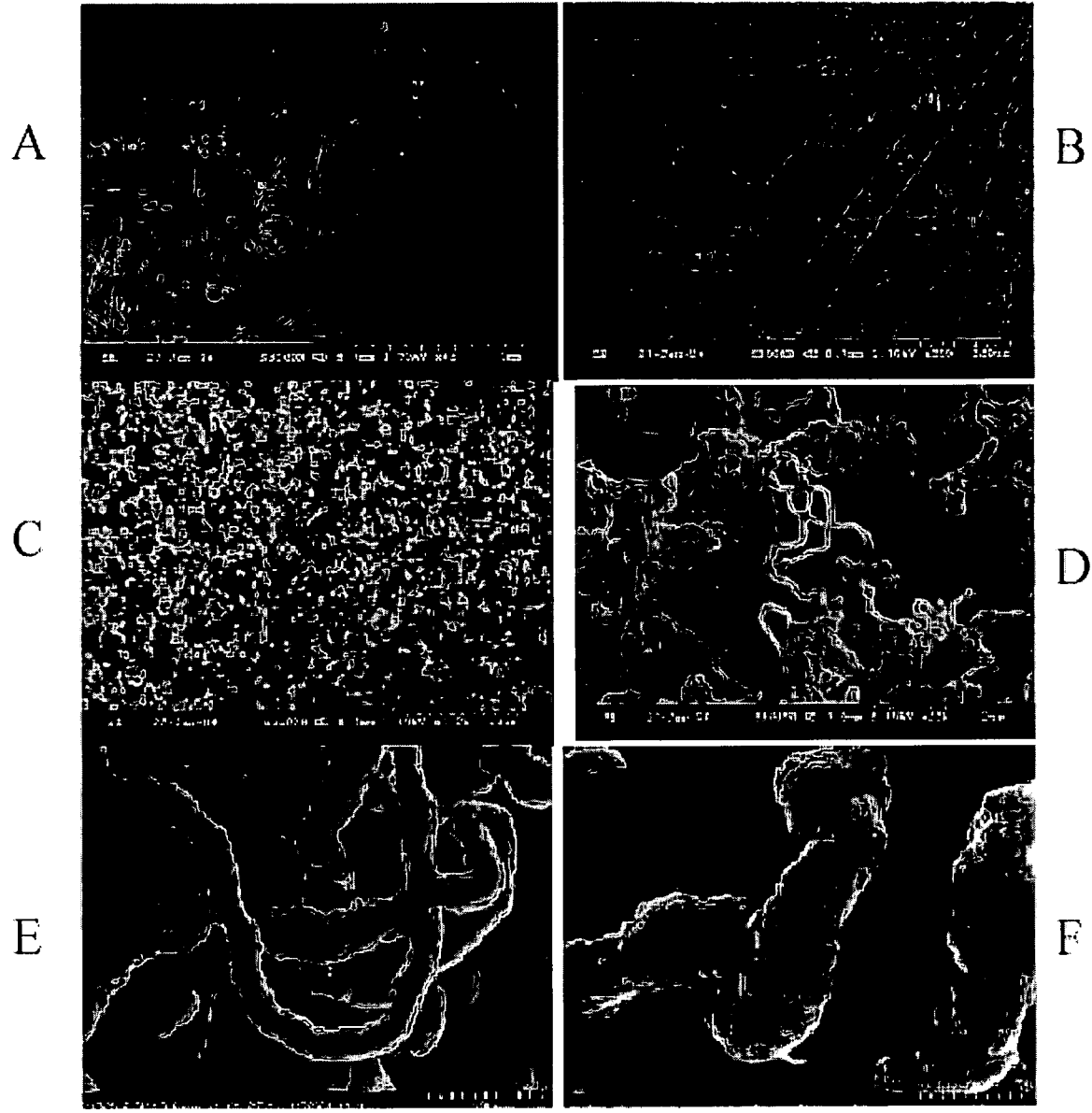
FIG. 13A, panels A through F, show SEM photographs of carbon nanotubes directly grown on carbon fibers of Toray Carbon Paper and thin films on carbon nanotubes. Panel A: An SEM photograph at 45× magnification of a sample of Pt thin film (250 Å) ion-beam sputtered onto carbon nanotubes which were directly grown on a carbon fiber paper substrate by chemical vapor deposition with Ni as the nanoparticles catalyst. The lighter area on the left corner shows the Pt coating. Panel B: An SEM photograph at 300× magnification of a sample of Pt thin film (250 Å) ionbeam sputtered on carbon nanotubes which were directly grown on a carbon fiber paper substrate by chemical vapor deposition with Ni as catalyst. It shows each individual carbon fiber of the top layer of Toray carbon paper bearing uniformly grown carbon nanotubes. Note the diameter of the fibers increase from ~10 µm for the bare carbon fibers to ~30-40 µm for the CNT coated fibers, indicating the thickness of CNT layer on carbon fiber is about 10 µm. Panel C: An SEM photograph at 3000× magnification of a sample of Pt thin film (250 Å) ion-beam sputtered on to carbon nanotubes which were directly grown on a carbon fiber paper substrate by chemical vapor deposition with Ni as catalyst. It shows uniform carbon nanotube networks on the carbon fibers. Panel D: An SEM photograph at 20,000× magnification of a sample of Pt thin film (250 Å) ion-beam sputtered on carbon nanotubes which were directly grown on a carbon fiber paper substrate by chemical vapor deposition with Ni as catalyst. It shows uniform carbon nanotube networks on carbon fiber. Panel E: An SEM photograph at 100,000× magnification of a sample of Pt thin film (250 Å) ion-beam sputtered on carbon nanotubes which were directly grown on a carbon fiber paper substrate by chemical vapor deposition with Ni as catalyst. It shows uniform size Pt coated of carbon nanotubes in order of 100 nm. Panel F: An SEM photograph at 200,000× magnification of a sample of Pt thin film (250 Å) ion-beam sputtered on carbon nanotubes which were directly grown on a carbon fiber paper substrate by chemical vapor deposition with Ni as catalyst. It shows a substantially continuous Pt thin film coating on individual carbon nanotubes.
Figure 13B:
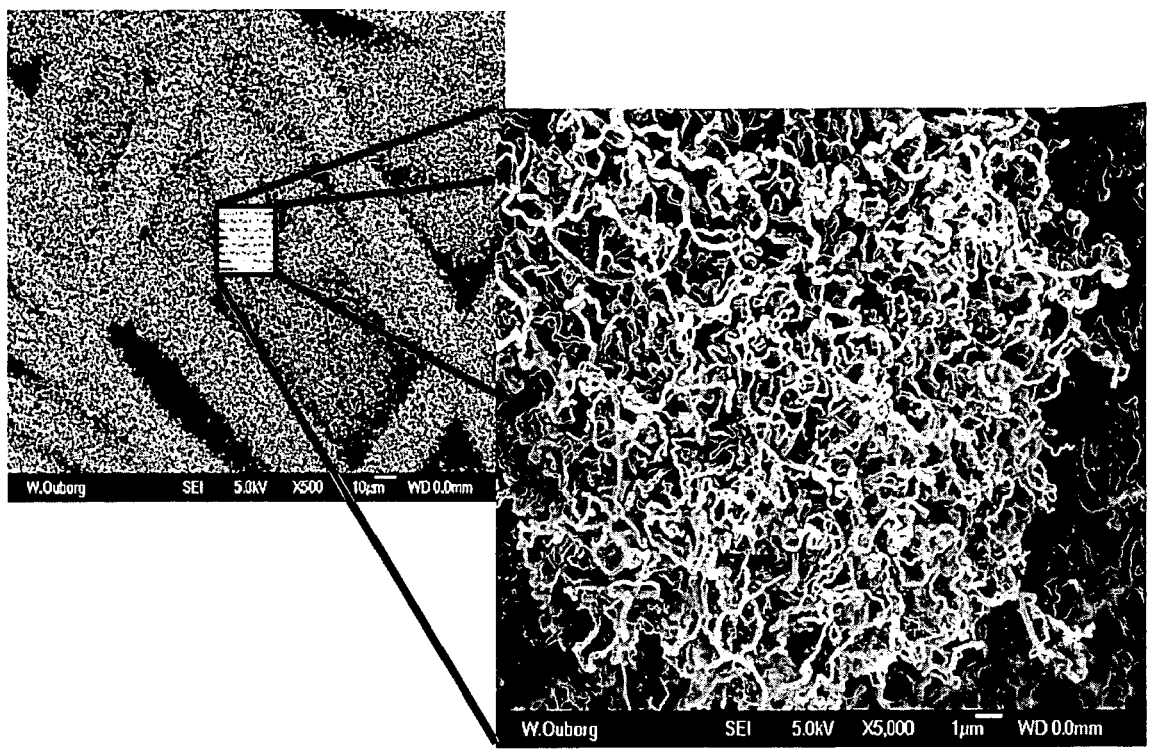

FIGS. 8A and 8B indicate that the density and size of carbon nanotubes, which are controlled by catalyst thickness, growth time and catalyst material effect catalyst performance. In certain embodiments, preferred carbon nanotubes are few to 100 nanometers with optimized density. FIG. 13 shows structures of thin-film catalyst coated on carbon nanotubes which are directly grown on carbon fibers in the top layer of Toray carbon paper at magnifications from 45 to 200,000 times by scanning electron microscope. The carbon nanotubes were uniformly grown on individual fibers as shown in FIG. 13 (panel B). The carbon nanotube layer is about 10 μm thick with uniform networks as shown in FIG. 13, panels C, D, and E. FIG. 13, panel F, shows substantially continuous Pt thin films (catalysts) on the carbon nanotubes.

The nanoparticles used in the catalysts of this invention can be provided in various forms, e.g. in solution, as a dried powder, and/or grown on porous substrates. In certain embodiments, the nanoparticles are grown and retained on a porous substrate. In certain embodiments, this porous substrate can itself act as an electrode.

II. Optimization of Nanoparticles Catalysts (Seeds)

In certain embodiments, this invention pertains to the optimization of catalysts for the growing of nanoparticles, more preferably for the growing of carbon nanotubes. In certain preferred embodiments, nanoparticles (e.g. carbon nanotubes) are grown on supports (e.g. carbon fibers) and then coated with a substantially continuous thin film (e.g., a catalytically active thin film).

When certain nanoparticles (e.g., carbon nanotubes) are grown, the nanoparticle catalyst ("seed") often remain exposed on the surface of the nanoparticle (e.g. at the end of a carbon nanotube). Consequently, when a thin film is applied to the nanoparticles comprising the catalyst (seed), the catalyst (seed) particles mix with material forming the thin film and can alter the catalytic activity of the thin film. Thus, it is desirable to grow the nanoparticles using nanoparticles catalyst materials that are compatible with growth of the nanoparticles and that either enhance, or do not substantially adversely affect the catalytic activity of the applied thin film.

It was a surprising discovery that not all nanoparticles catalysts are good for both nanoparticles growth and fuel cell operation. Thus, for example, iron, is a good for growing carbon nanotubes, but can interfere with the catalytic activity of the applied thin film. Some elements, such as aluminum, appear to have no substantial adverse effects on fuel cell operation. Some elements or their alloys are good for both nanoparticles (e.g., carbon nanotube) growth and fuel cell operation. These "optimal" seed materials include, but are not limited to Co, Ni, V, and Mo.

It was a surprising discovery that the alloys listed below are particularly well suited for carbon nanotube growth and also fuel cell operation. They can enhance the fuel cell catalytic properties greatly in many cases.

1. $Co_{1-x}Mo_x$ where $0 \leq x \leq 0.3$;
2. $Co_{1-x-y}Ni_xMo_y$ where $0.1 \leq x \leq 0.7$ and $0 \leq y \leq 0.3$;
3. $Co_{1-x-y-z}Ni_xV_yCr_z$ where $0 \leq x \leq 0.7$, $0 \leq y \leq 0.2$, and $0 \leq z \leq 0.2$;
4. $Ni_{1-x-y}Mo_xAl_y$ where $0 \leq x \leq 0.2$, $0 \leq y \leq 0.2$;
5. $Co_{1-x-y}Ni_xAl_y$ where $0 \leq x \leq 0.7$, and $0 \leq y \leq 0.2$; and
6. $Fe_xNi_yCo_{1-x-y}$ where $0 \leq x \leq 1$ and $0 \leq y \leq 1$.

In certain particularly preferred embodiments the catalysts for growing the nanoparticles include, one or more of the following: $Co_{8.8}Mo_{1.2}$, $Co_{2.2}Ni_{5.6}Mo_{2.2}$, $Co_{5.7}Ni_{2.1}V_{1.1}Cr_{1.1}$, $Ni_{8.0}Mo_{1.0}Al_{1.0}$ and $Co_{6.4}Ni_{2.4}Al_{1.2}$.

III. Electrode-Membrane Combinations and Fabrication Methods

In certain embodiments, the fuel cell catalysts of this invention (nanoparticles partially or completely covered with a substantially continuous thin film) are fabricated into electrode/membrane combinations. One typical electrode/membrane combination includes at least a first conductive electrode comprising a first fuel cell catalyst (nanoparticles partially or completely coated with a substantially continuous catalytic thin film); at least a second conductive electrode comprising a second fuel cell catalyst; and a proton exchange membrane separating the first conductive electrode and the second conductive electrode.

Figure 14A:
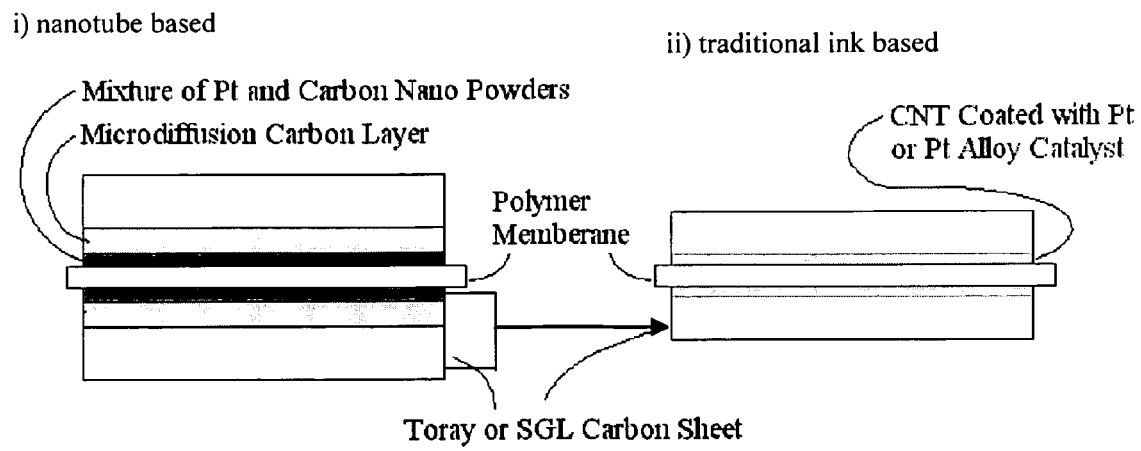
FIGS. 14A and B illustrates an advantage of the fuel catalysts and nanoparticles of this invention. In certain embodiments, the fuel cell catalysts can be incorporated into the porous electrodes (illustrated by embodiment 14A right) thereby eliminating the separate catalyst layers and microdiffusion layers present in a more traditional configuration (illustrated by embodiment 14A left). An SEM micrograph of the actual structure is shown in FIG. 14B with the carbon paper support being on the bottom and CNT layers being shown on the top and bottom of the polymer membrane. An actual MEA fabricated as per this invention (14A right) is shown in an SEM image in FIG. 14B.

In a more traditional configuration (see, e.g., "ii) in FIG. 14A), the catalyst (nanoparticles coated with a thin film) forms a separate layer on the electrode or on a polymer membrane. In addition, a microdiffusion layer can optionally be present. Such a configuration thus comprises seven discrete layers (two electrodes, two catalyst layers, two microdiffusion layers, and a PEM). It is a surprising discovery and advantage of the present invention however, that the nanoparticles can interleave with the fibers comprising a gas-diffusable electrode (e.g. a carbon fiber sheet) and thus the fuel cell catalyst (thin-film coated nanoparticles) can be fabricated so that they are integral with the electrode.

In addition, the nanoparticles catalyst itself can be capable of acting as a microdiffusion layer, so no additional microdiffusion layer is necessary or desired. Thus, in certain embodiments, this invention contemplates an integrated gas-diffusion/electrode/catalyst (IGEC) and membrane combination comprising only three layers; e.g., two IGEC layers separated by a proton exchange membrane (see, e.g., "ii)" in FIG. 14A).

Figure 10:
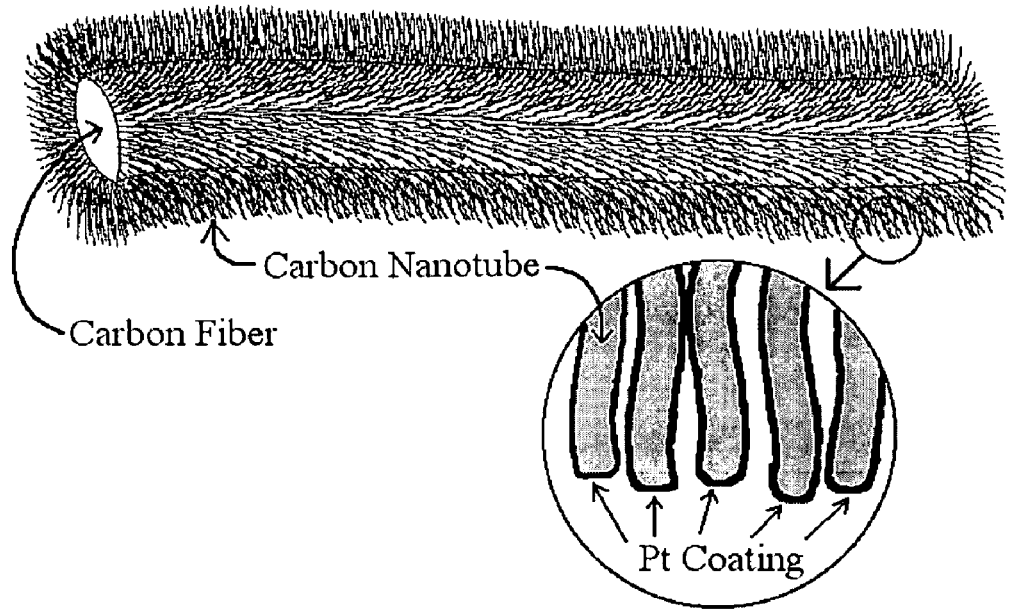
FIG. 10 illustrates nanoparticles (e.g., carbon nanotubes) grown on fibers (e.g., carbon fibers). The nanoparticles are coated with a catalytically active substantially continuous thin film or Pt (see inset).
Figure 11:
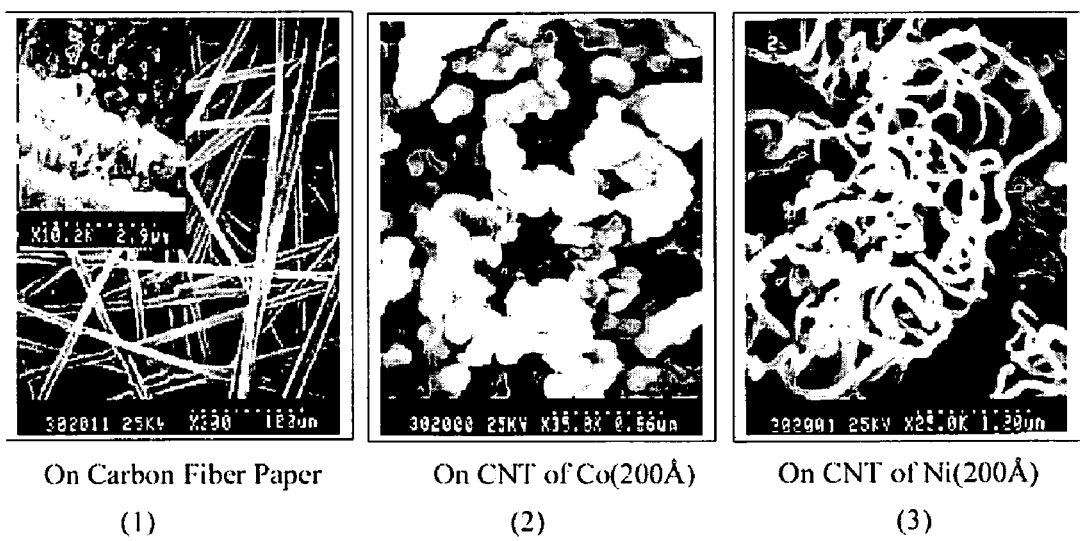
FIG. 11 shows SEM photographs of three samples: (1) $Pt_{0.12}Co_{0.88}$ thin film catalyst directly coated on carbon fiber paper, (2) $Pt_{0.12}Co_{0.88}$ thin film catalyst coated onto carbon nanotubes which were directly grown on carbon fiber paper using 200 Å Co nanoparticles catalyst, and (3) $Pt_{0.12}Co_{0.88}$ thin film catalyst coated on carbon nanotubes which are directly grown on carbon fiber paper with 200 Å Ni nanoparticles catalyst.

Such an integrated microdiffusion layer and catalyst/carbon layer can be readily fabricated. For example, carbon nanotubes (CNT) can be directly grown on carbon fibers on the surface layer (1-5 fiber diameter) carbon fiber sheet (see, e.g., FIG. 10). The bare carbon fiber diameter is about 10 μm (see, e.g., FIG. 11, panel 1) and the CNT covered carbon diameter is about 50 μm (see, e.g., FIG. 13B). The large pores of the gas diffusion electrode are thus converted into small pores and the CNT covered top carbon fiber layer can act as a microdiffusion layer enhancing the dispersion of gas (e.g. hydrogen) to the catalyst. The platinum or alloy thin film coating on top of the carbon nanotubes acts as an efficient catalyst structure with large surface area.

Figure 12:
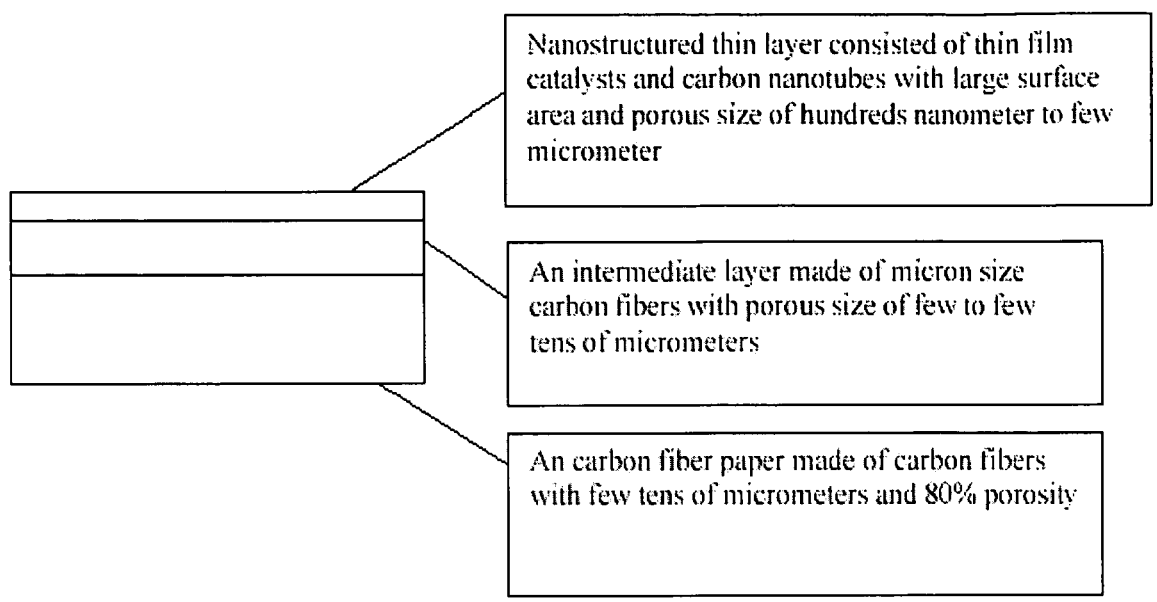
FIG. 12 illustrates a structure of three-layer electrical conducting materials with optimized porosity and thickness for each layer.

In an alternative approach, nanoparticles (e.g., CNTs, CNHs, or other nanopowders) can be sprayed, on carbon fiber sheet (or other gas diffusion electrodes) and the thin film is then coated on the nanoparticle layer. An intermediate microdiffusion layer can, optionally, be used between the nanoparticle/catalyst layer and carbon fiber sheet (gas diffusion electrode), e.g. as shown in FIG. 12.

In certain embodiments, fibers or whiskers made of carbon, and/or other electrical conducting materials, are grown up on porous electrical conducting substrates. They can be used as a support for the catalytic thin film. In one preferred approach, carbon nanotubes are grown directly on a commercial carbon fiber paper; then a thin layer of catalyst, e.g., Pt, Ni, Co, Fe and their alloys, is deposited by chemical vapor deposition on the carbon nanotubes as shown schematically in FIG. 1. Carbon nanotubes or other similar electrical conducting nanostructured materials can also be sprayed or brushed on carbon fiber paper (gas diffusion) electrodes. Platinum alloy thin film catalysts can then be deposited on these carbon nanotube layers which directly contact a proton exchange membrane (PEM).

In certain embodiments, carbon nanotubes or other similar electrical conducting nanostructured materials can also be prepared as a thin sheet with an optimized porosity and preferred thickness e.g., of a few nanometers to tens of micrometers. The thin sheet is then placed or pressed on carbon fiber paper. The thin film catalysts can then be deposited on the carbon nanotube sheet which directly contacts the proton exchange membrane.

In certain preferred embodiments, the carbon nanoparticles (e.g. carbon nanotube) are coated with the thin film catalysts first. For example electroplating can be used to fabricate such catalyst-coated carbon nanotubes or other similar electrical conducting nanostructured materials. These catalyst-coated electrical conducting nanostructured materials can then be sprayed, brushed or painted on the carbon paper electrodes or on fuel cell membrane layer. Alternatively, these catalyst coated electrical conducting nanostructured materials can also be prepared as a thin sheet with an optimized porosity and preferred thickness of few to tens of micrometers. Such sheet will then placed or pressed on carbon fiber paper.

Figure 14B:
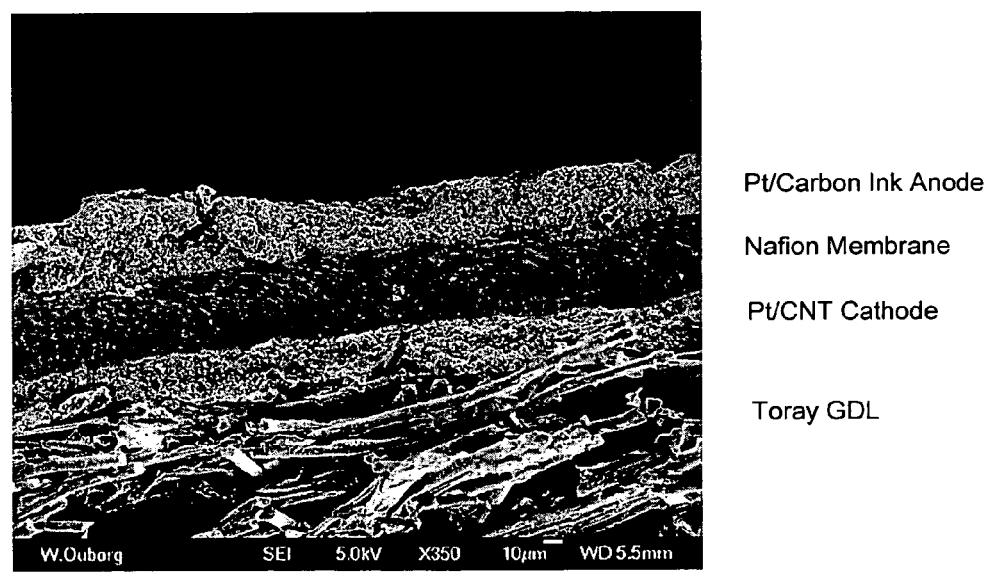

In general, one preferred structure of three-layer electrical conducting materials with optimized porosity and thickness for each layer is the most efficient and economic for fuel cell operation as shown in FIGS. 12 and 14. For example, the top layer can be made of catalytic thin film catalyst coated carbon nanotubes having diameters ranging from a few nanometers to 100 nanometers with, e.g., high aspect ratios to provide as large surface as possible for catalysis and a uniform micro or nano-porous distributed layer. The thickness of this layer can be precisely controlled (e.g., to a few tens of nanotube layers since these are expensive materials). In certain embodiments, the intermediate layer is made of carbon fibers or powders with a fiber or a carbon sphere diameter of sub-micrometer to a few micrometers, and a layer thickness about ten to a few tens of micrometers. The commercial Toray carbon fiber paper with a fiber diameter ranging from a few to a few tens (e.g., 3 to 100) of micrometers, and a paper thickness of few hundreds of micrometers, is well suited for this application. Such structures can have an average pore size and pore density gradually changing from bottom layer to the top layer.

Materials for use as proton exchange membranes (PEMs) are well known to those of skill in the art. Suitable proton exchange membrane materials include, but are not limited to Nafion brand ionomer, silicon oxide Nafion composite (see, e.g., Adjemian et al. (2002) *J. Electrochem. Soc.,* 149(3): A256-A261), polyphosphazenes (a hybrid inorganic/organic polymer with a —P=N— backbone) for high temperature PEMFCs (see, e.g., Fedkin et al. (2002) *Materials Letters,* 52: 192-196; Chalkova et al. (2002) *Electrochemical and Solid State Letters,* 10: 221-223), metal foams (see, e.g., (2002) *Fuel Cell Technology News,* 4(9)), sulfonated poly(2,6-dimethyl-1,4-phenylene oxide) (PPO), polystyrene-block-poly(ethylene-ran-butylene)-block</I>-polystyrene, poly[(vinyl chloride-co-(1-methyl-4-vinylpiperazine, poly(2-vinylpyridine-co-styrene), silica-polymer composite proton exchange membrane, and the like.

IV. Coating Gas Diffusion Layers with Hydrophobic Materials

In order to help the composite triple layer electrode structures to shed the water reaction product during fuel cell operation, the porous gas diffusion layer can have a hydrophobic surface. In many cases, where the diffusion layer is based on a carbon fiber substrate, hydrophobicity and removal of water can be enhanced by coating the substrate with a hydrophobic polymer, such as Teflon brand polytetrafluoroethylenes, or aluminum oxide treated, e.g., with fluoroalkylsilanes. However, it is often undesirable to coat the electrode layer with the hydrophobic material. The following strategy can be useful to selectively coat a substrate that is initially relatively hydrophilic compared to the electrode layer. The hydrophobic layer can be coated onto the electrode, then the surface can be etched, either by plasma or by liquid, in order to allow for the deposition of metal directly on the carbon nanostructures. This method provides for an intimate electrical contact between the platinum/alloy and the electrode without interference from the insulating hydrophobic layer. Alternatively for the case of aluminum oxide (AlOx), which can withstand high temperatures, only the carbon paper support would be coated with AlOx, the surface etched for nickel/alloy deposition, the nanotubes grown by CVD, platinum/alloy deposited, and then finally the entire electrode treated with fluoroalkylsilane.

V. Electrodeposition of Catalyst Metals onto Nanostructures

Electroplating catalyst metals onto nanostructures of electrodes in the invention is an option that has certain advantages over methods in many cases. In some embodiments of the invention, catalyst metals, such as platinum, can be applied to nanostructure electrode surfaces by physical application, contact with metal containing "inks", sputtering of the metal onto the nanostructures, or vapor deposition of the metals onto the nanostructures. However, in some applications these techniques lead to inefficient use of the catalyst, reduced porosity and sub-optimal catalyst surface area. We have found that, electrodeposition procedures can be practiced on some nanostructures to apply catalytic metals in a uniform, well dispersed and controlled fashion.

In one aspect, carbon nanotube (CNT) electrodes, e.g., having a porous conductive substrate bearing a layer of carbon nanotubes, can be prepared as described herein, and a thin layer of catalyst can be controllably deposited on the nanostructures by electrolysis. The electrode nanotube surface can be sometimes hydrophobic, as initially prepared. However, the electrodes can be made hydrophilic, e.g., by heated up at 350° C. in air. Optionally, we have found that addition of wetting agents, such as surfactants, ampholytes, and water soluble organic compounds to plating solutions can enhance the wettability of nanostructure layers. Better wetting of the nanostructures has been found to improve the density, depth, and dispersion of catalytic metal electrodeposition. In a preferred embodiment, nanotubes can be better wetted and more affectively coated with catalyst using a plating solution containing isopropyl alcohol.

A thin electrode seed layer can be applied to the nanotubes before the electroplating step, e.g., to direct and accelerate later electrodeposition of metals onto the nanotubes. For example, after heat treatment, a 25 Å coat of platinum can be sputtered onto the electrode as a seed layer for latter electroplating. Optionally, the seed coat can be other metals such as, e.g., Co, Ni, V, Cr, Pt, Ru, Mo, W, Ta, Zr, and the like.

The electroplating solution typically contains soluble salts of the desired metals, e.g., along with additives for control of pH, wetting, plating morphology, and such. For example, a preferred electroplating solution contains $H_2PtCl_6$, HCl, and lead acetate (to improve deposition surface morphology). The plating solution can contain combinations of metals, resulting in uniform alloy coatings or coatings with alloy compositions changing through the thickness of the coat. In a typical embodiment, the plating solution contains about 10 g/L platinum and about 60 g/L HCl.

Figure 19:
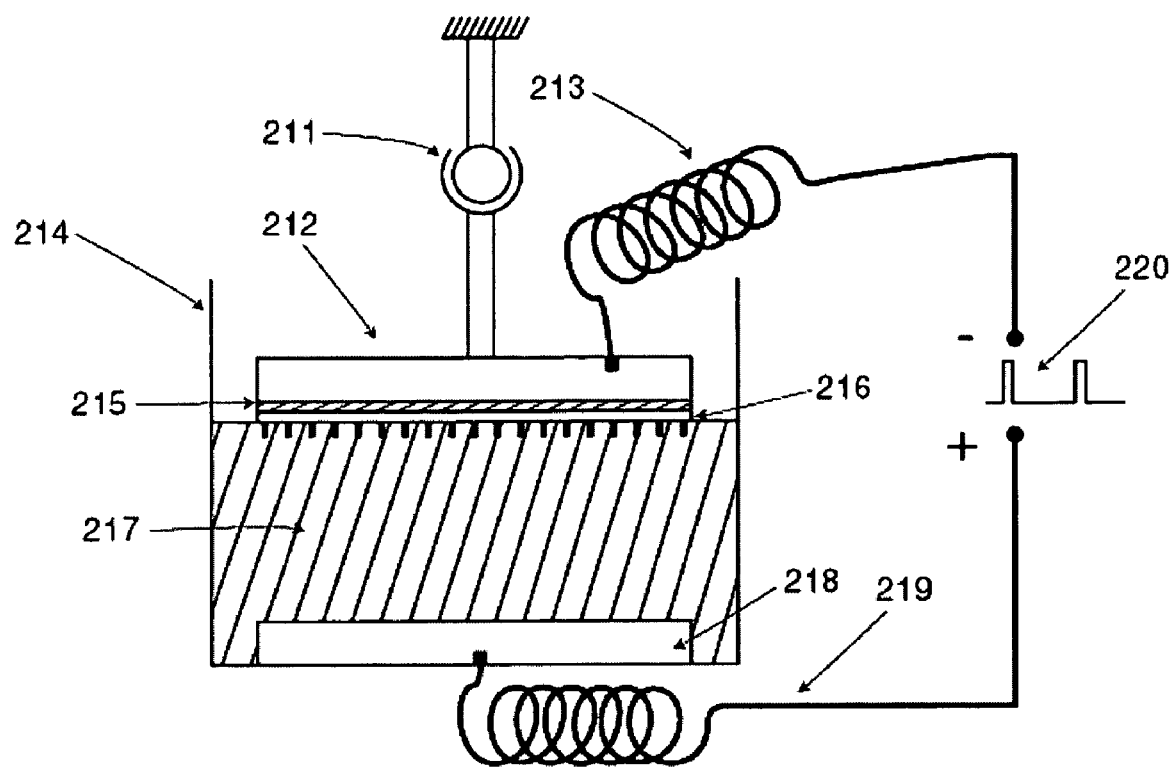
FIG. 19 is a schematic diagram of a system for electrodeposition of metals onto a nanostructure electrode.
Figure 20:
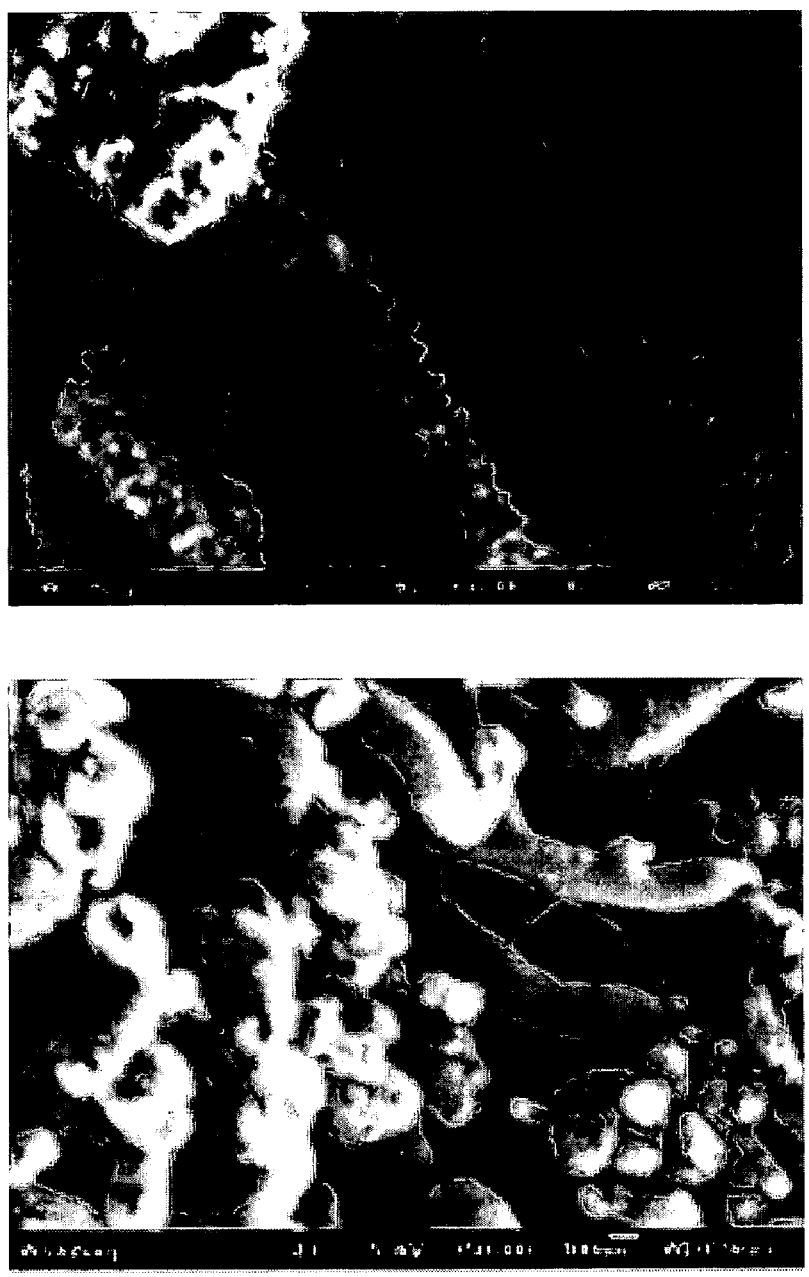
FIG. 20 shows a comparative SEM of carbon nanotubes with platinum electroplated on them (top) and with subsequent nafion coating (bottom).
Figure 21:
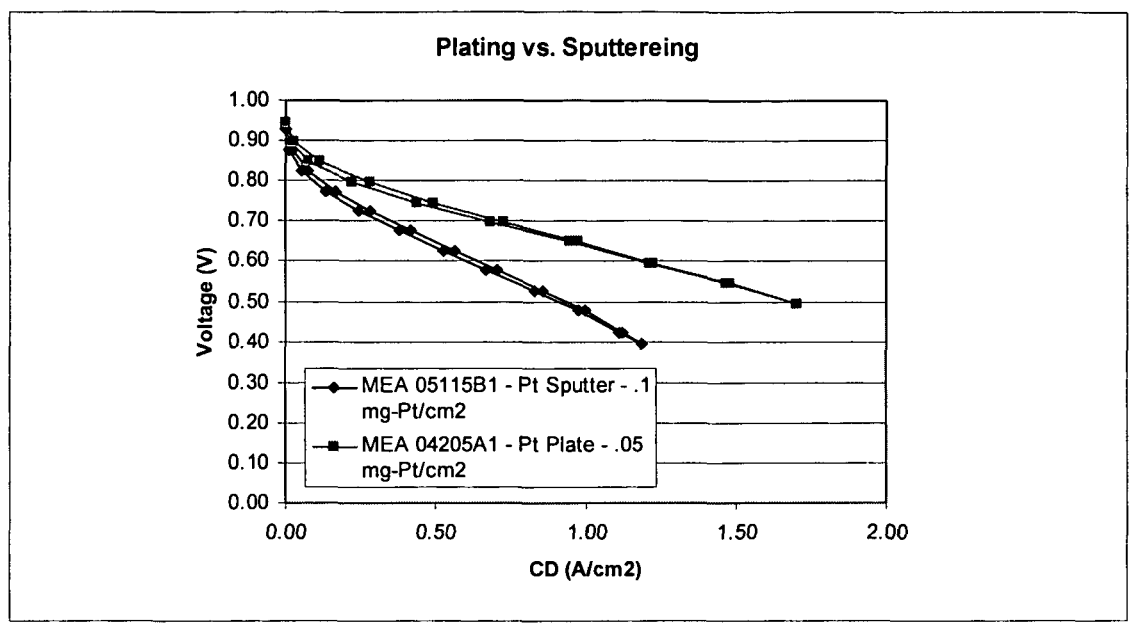
FIG. 21 shows a comparison in fuel cell performance between MEA's fabricated using sputtered platinum and electroplated platinum.
Figure 22:
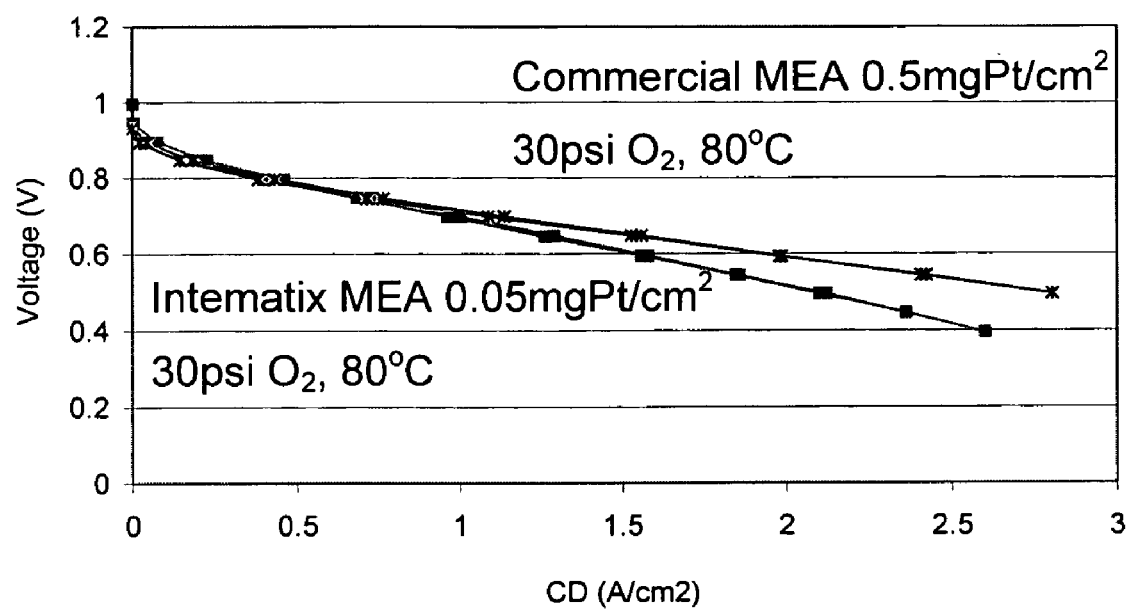
FIG. 22 shows a comparison in fuel cell performance between a commercial MEA fuel cell with high platinum loading (0.5 mg Pt/cm$^2$) and a nanotube based MEA (0.05 mg Pt/cm$^2$) with low platinum loading.

A typical system for electroplating metals onto CNT electrodes is shown in FIG. 19. CNT electrode 216 is mounted onto a cathode with the nanotube layer facing out and the conductive substrate layer in electrical contact with the cathode. Uniform current flow through the CNT electrode can be provided by placing a layer of copper tape 215 between the CNT electrode and graphite block 212. The graphite block can be pivotably mounted on a ball joint 211 so that the CNT electrode can be placed precisely flat onto the top surface (in the same plane) of plating solution 217 held in container 214. Power supply 220 can be in electrical contact with the cathode through cathode connection 213 and with anode 218 (immersed in the plating solution) through anode connection 219.

In operation, direct current from the power supply provides electrons at the cathode, attracting positively charged metal ions to the CNT electrode surface where they are converted to metallic form by receipt of electrons. Counter ions of the metals migrate to the anode where they give up electrons, e.g., to form elemental gasses. In a preferred embodiment, the power source provides a pulsed net DC current. In a typical plating operation of Pt onto a CNT electrode, the power source provides a 40 Hz current pulse with a 20% duty cycle. Plating can continue, e.g., with a current density of about 200 mA/cm$^2$ for about 15 sec to complete the plating (electrodeposition) of about 0.5 mg/cm$^2$ platinum loading onto the nanotubes. After plating, the sample is washed thoroughly to remove the residual plating solution.

The conductivity of the plating solution can affect the depth of metal electrodeposition within a nanostructure layer. Without being bound to a particular theory, a lower current flow experienced in low conductivity solutions can cause available metal ions to be scavenged at the outer tips of the nanostructures without significant plating at the nanostructure surfaces closer to the electrode substrate. A higher current flow can result in an abundant metal ion flux that penetrates deeper into the carbon nanotube layer. The conductivity of the plating solution can be adjusted, e.g., by controlling the solution pH, the amount of metal salts, and/or the concentration of other electrolytes in the solution.

In another embodiment, the depth of electrodeposition can be affected by controlling the amount of time electrolyte has to migrate into the nanostructure layer. For example, before contacting the plating solution surface, a CNT electrode can be saturated with a low conductivity solution without significant concentrations of metal ions. The CNT electrode can be placed in contact with the plating solution to allow diffusion of the catalyst metal ions into CNT layer. Depending on the diffusion time, the metal ions penetrate different distances into the CNT layer. When the plating current is finally applied, the amount of catalyst metal plated through the depth of the CNT layer can depend on how long the ions were allowed to diffuse into the layer. In one embodiment, diffusion speed of typical ions in aqueous solution was in the order of 0.1 μm per second, so a 5 μm thick catalyst layer could be formed, e.g., after a diffusion waiting time of about 50 sec.

VI. Impregnating the Electrode Layer with a Polyion

It is desirable that the electrode nanostructure have some surface ionic character to facilitate the conduction of electrons and/or facilitate transit of protons in fuel cell applications. However, in the case of carbon nanotubes grown on a substrate layer, it can be difficult, to coat the nanotubes with conductive materials using standard methods. Methods, such as dipping, spraying and brushing coating materials typically fail to provide a uniform coat, a thick coat, or a coat that penetrates adequately into the CNT layer.

Figure 15A:
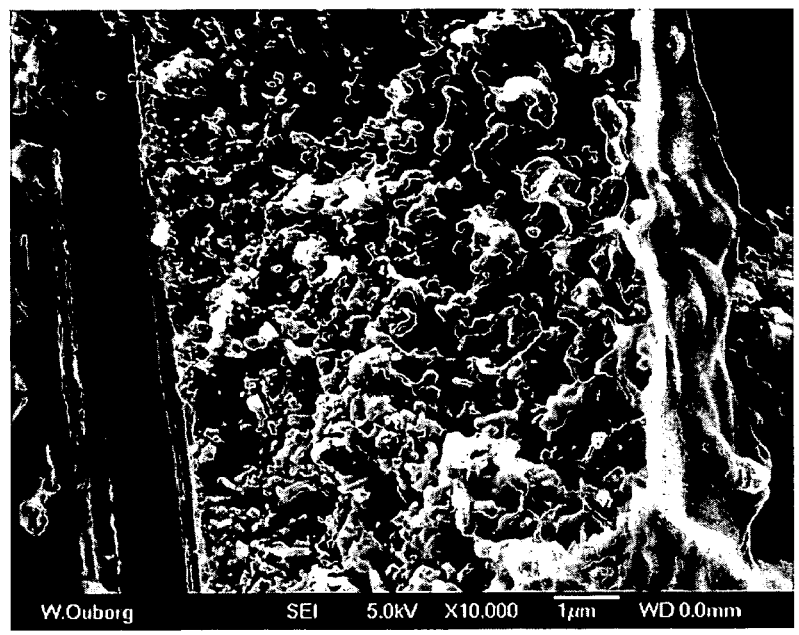
FIGS. 15A and B are electron micrographs showing relatively dispersed and uniform ionomer coating achievable using high pressure contacting of nanotubes with an ionomer solution.

For example, spaying the nanostructure layer with an ionic polymer can tend to form a thick film on top of the nanostructure rather than penetrating and coating. FIG. 15A is a scanning electron microscope image showing how sprayed perfluorocarbonsulfonic acid ionomer (Nafion®) forms an occlusive top layer. This problem arises for a variety of reasons. For example, according to Stock's law, the friction or drag in terms of pressure increase inverse proportionally with size when a small solid sphere moves in a liquid. Thus, at nano scale, the pressure needed for moving liquid into solid structure is huge. Moreover, the CNT surface is typically hydrophobic and will tend to repel the Nafion solvent. Once a Nafion film starts to form on top of the nanostructure, it only compounds the problem of penetration.

Figure 15B:
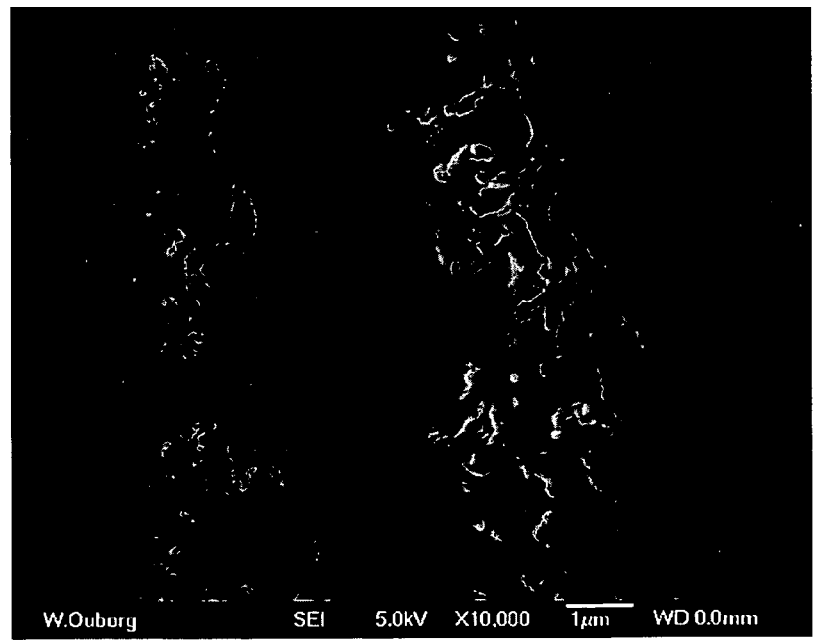
Figure 16:
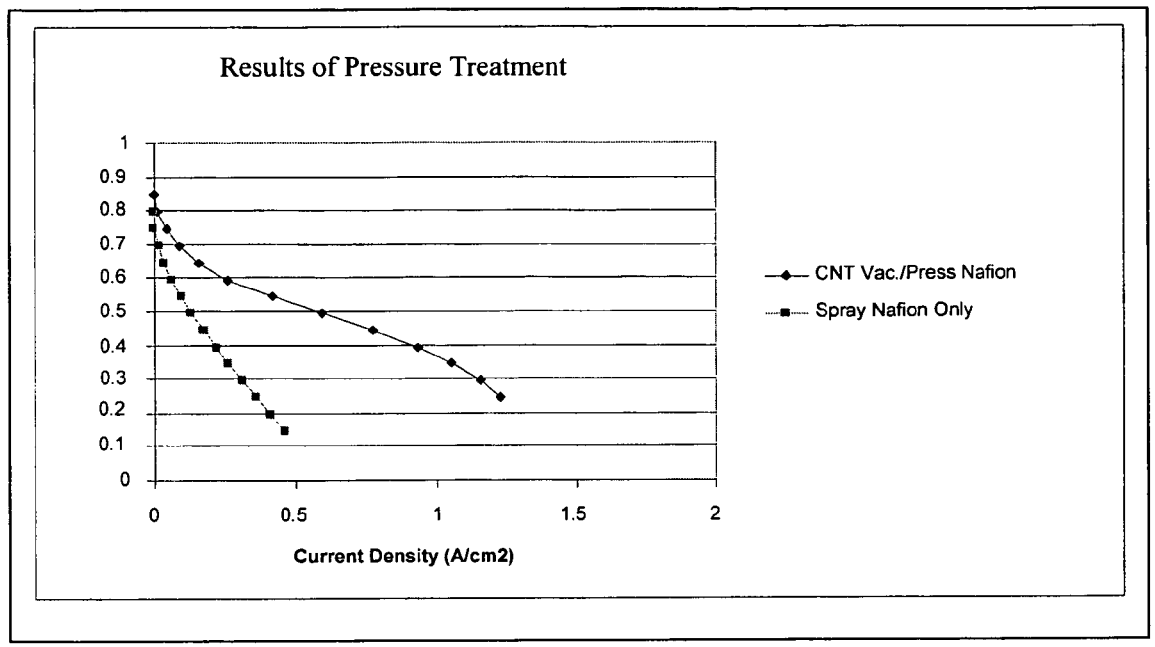
FIG. 16 is a chart showing improved current density in an electrode ionomer coated at a high pressure. The Y-axis represents voltage and the X-axis represents current induced by the corresponding voltage.

We have found that application of hydrostatic pressure can greatly improve coating of nanostructures with ionic polymers. Contact and coating of nanostructures with polyions (ionomers), such as a Nafion solution, can be greatly improved by contacting at high pressures ranging, e.g., from about 100 psi to about 10000 psi, or about 5000 psi. Contact and coating of nanostructures under high hydrostatic pressures can give a more uniform and complete coating, as shown in FIG. 15B. The improved coating can significantly improve the capacity and current density for electrode layers coated with using the high hydrostatic pressure technique, as shown in FIG. 16.

Figure 17:
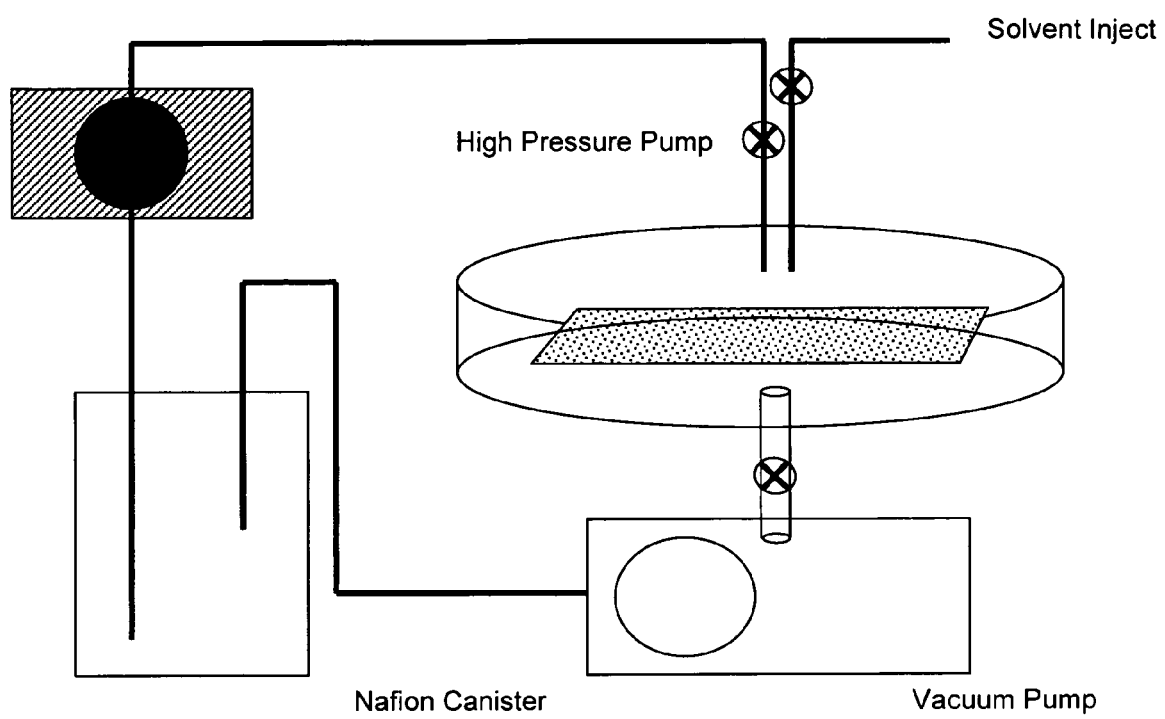
FIG. 17 is a schematic diagram of a system using a high pressure pump to coat nanostructures with an ionomer.

The nanostructures can be contacted with the ionomer solution under pressure in a pressure vessel. The nanostructures can be premixed with the ionomer solution before introduction to the vessel or they can be mixed in the vessel. In some embodiments, the ionomer solution is combined with the nanostructures by flowing the solution through a bed of the structures. The vessel can be a chromatography column and the solution can be pumped through the nanostructures using a high pressure liquid chromatography (HPLC) pump. Nanostructures can be contacted with the solutions at high pressures in batch or continuous processing modes. For example, as shown in FIG. 17, a system for coating of nanostructures (bound or not to a substrate) can include a high pressure pump to introduce an ionomer solution to at high pressure to a pressure vessel containing the nanostructures. Optionally, the system can include a drain and vacuum pump to recover unused solution.

Figure 18:
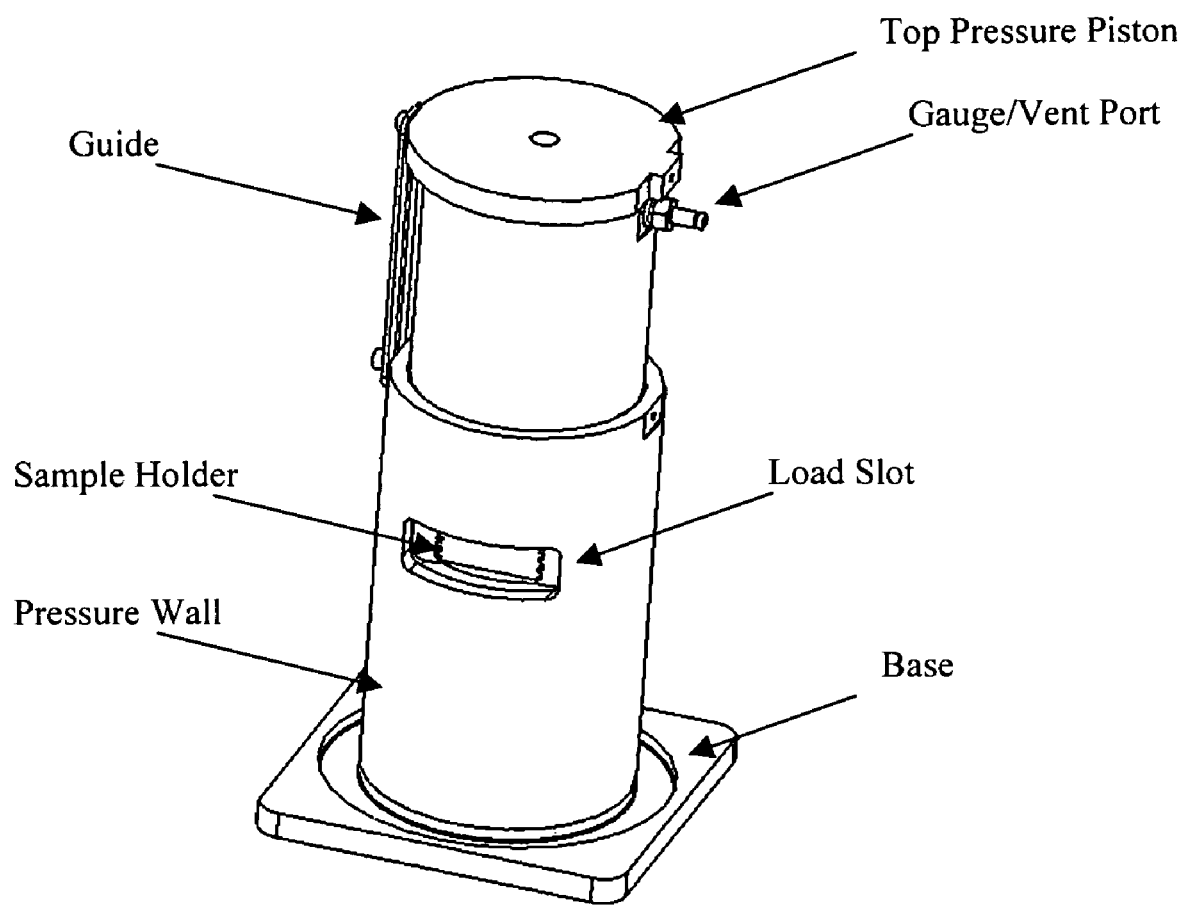
FIG. 18 shows a schematic diagram of a pressure cell designed to be compressed with a hydraulic press. It consists of a top piston which compresses the fluid and pressurizes the samples held on the sample holder.

The pressure can be generated by any appropriate technique known in the art. The pressure can be from, e.g., pressurized gasses, explosive chemical reactions, piston pumps, mechanical compression of chambers, and/or the like. In a particular embodiment, shown in FIG. 18, for example, high pressure can be generated manually for batch processing of the coating step. The nanostructures, free or bound to a substrate, can be placed in the pressure vessel chamber along with the ionomer solution. The pressure vessel cap can be threaded onto the top of the chamber to form a seal. Additional turning of the cap can result in very high chamber internal hydrostatic pressures that increase the efficiency of nanostructure/solution contact and coating processes.

In many cases, we have found that pretreatment of the nanostructure in the ionomer solution can further enhance the efficiency of coating. For example, the combined nanostructure and polyion solution can be pretreated by exposure to a vacuum pressure (environmental pressure less than one atmosphere). Vacuum pretreatment can include exposure of the nanostructures in the solution to a pressure less than 300 torr, less than 100 torr, less than 5 torr or less than 1 torr. Not being bound to a particular theory, we believe the vacuum treatment expands gasses trapped between the nanostructures, allowing them to escape; the solution replacing the gasses on return to ambient pressure. Pretreatment can include sonication of the nanostructure/solution combination. Again, it is believed the sonication aids in removal of gasses on the macroscopic and microscopic scale, so the solution can gain better access to nanostructure surfaces.

In some embodiments, repeated high pressure processing cycles can be used to control or increase coating thickness. For example, after several minutes under pressure, the nanostructures can be taken out of the pressure vessel and dried, e.g., in ambient air for 15 minutes. Then, the nanostructures can be combined with additional ionomer solution before exposure to high pressure followed by drying. A thin film of solidified polyion can be formed on the nanostructure surface, after each drying, that accumulates with each processing cycle. The cycles of combination, pressurization and drying, can be repeated until the desired coating thickness and/or percent surface coverage is obtained. We have found that washing the nanostructures with ethanol and removal by application of vacuum can help avoid too much polyion accumulation in undesired places, such as gas diffusion channels.

In another variation, a thin film of an ionomer, such as Nafion, can be applied by brushing or spraying onto the nanostructure before drying. The nanostructure can then be put into a solvent, such as isopropanol before application of hydrostatic pressure in a pressure vessel. The ionomer can migrate to coat nanostructures beneath to zone of application. This technique has the benefit of providing control over the loading and location of polyion coating.

VII. Processes Employing Plasma Etching

Plasma etching can be used in various processes, described herein, for preparation of electrodes comprising porous substrates bearing nanostructures. Plasma etching can controllably treat a substrate surface or nanostructure surface, resulting in, e.g., removal of a layer from the surface and/or a change in certain qualities of the surface. Plasma etching can be used in conjunction with other methods to facilitate processing steps and/or to control properties of electrode final products.

Plasma etching typically takes place with an electrode on a stage in a vacuum chamber. The chamber has an ion or electron (plasma) source that can inject a stream of charged particles into the chamber. The electrode is typically a planar or membranous layered structure and usually rests on the stage with the side to be etched facing the plasma source. The interaction of the electrode surface with the plasma can result in material being removed from the surface and/or changes in the surface chemistry. The extent of material removal or other surface changes can be influenced to the intensity of the plasma and/or the time of surface exposure to the plasma. The intensity of the plasma can be adjusted in many ways, known in the art, e.g., by adjusting the voltage of the plasma source, adjusting the flow rate of gasses fed into the plasma source, adjusting the pressure within the chamber, adjusting the focus of a plasma beam, and/or the like. For example, the voltage of the plasma source can be adjusted in a range from about 100 V to about 3000 V, from 500 V to about 2000 V, or about 1000V. The chamber pressure can be adjusted, e.g., in the range from less than about 0.1 torr to about 500 torr, from about 1 torr to about 100 torr, or about 10 torr.

In one embodiment, plasma etching can be used to increase the hydrophilicity of a nanostructure layer. Without being bound to any particular theory, the charged particles can interact with nanostructure surface in chemistries that produce polar or charged chemical structures. Such chemical structures can have an affinity for polar solvents, such as aqueous solutions, thus improving chemical and/or physical interactions between the nanostructures and certain solutions.

In an embodiment of the invention, an electrode comprising a layer of carbon nanotubes bound to a porous substrate layer of carbon fibers is etched by exposure to a plasma to improve subsequent coating with an ionomer. In many cases, after chemical vapor deposition of carbon nanotubes onto a substrate to form the electrode, the nanotubes are substantially hydrophobic and not very receptive to processing by aqueous chemistries. In order to increase the hydrophilic character of the nanotubes, the electrode can be placed in a vacuum chamber on a stage with the nanotube layer facing the chamber cavity. The chamber can be partially evacuated and an argon ion plasma injected from a plasma source. With time and intensity of plasma exposure, the nanotubes can become less hydrophobic. Longer and more intense treatments can result in improved hydrophilicity in deeper zones of the nanotube layer. The nanotubes thus treated can be contacted with an aqueous emulsion or solution of an ionomer to receive an ionomer coating with improved quantity, dispersion and/or uniformity. This technique can be used in conjunction with the high pressure coating techniques described above.

In another embodiment, a layer of carbon nanotubes bound to a porous substrate layer of carbon fibers is etched with a plasma to improve wettability of the nanotube layer in preparation for subsequent processing by an electrodeposition method. For example, a carbon nanotube layer of an electrode can be exposed to a plasma that converts the relatively hydrophobic CNT surface into a relatively hydrophilic surface. In subsequent electroplating procedures, electroplating solutions will realize more thorough contact with the nanotubes. The extent of conversion can influence the depth and quantity of the subsequent electrodeposition.

In an aspect of the invention, plasma etching of electrode layers can be used to remove undesired materials from surfaces of the layers. For example, plasma etching can be used to remove undesired substrate coating material or wax masking material from nanostructures. Instead of using the wax masking scheme to prevent substrate coating material from contacting and undesirably coating the nanotube layer, the coating material (i.e. Teflon or treated Aluminum Oxide) can be allowed to contact the nanotube layer. Subsequently, plasma etching can be used to remove the coating material from the contacted nanotubes. The etching can remove the coating material (and possibly increase the nanotube hydrophilicity) without removing the desired coating from the substrate layer. In this way the nanotubes can be made accessible for subsequent processing, such as, e.g., contacting and ionomer coating of the nanotubes, electrodeposition of metals onto the nanotubes, etc. The depth of the subsequent processing can be influenced by the depth of the etching, as described above.

VIII. Fuel Cells and Fuel Cell Applications

The membrane electrode combinations (membrane electrode assemblies) of this invention can be stacked (assembled) to increase the voltage and hence, the current and/or power output. Fuel cells can be configured to deliver desired levels of power for the particular application(s) for which the fuel cell is intended. Within the stack, adjacent single cells (membrane electrode assemblies) are typically electrically connected by means of bipolar plates (BPP) positioned between the surfaces of the electrodes opposite to those contacted with the electrolyte membrane. These BPPs are typically impermeable for the reactants to prevent their permeation to the opposite electrode, mixing and uncontrolled chemical reactions. With respect to this function, the BPP is often referred to as separator. BPPs or separators are often made of metals, particulate carbon and graphite materials, impregnated graphite, or molding compounds consisting of graphite and a polymer binder (see, e.g., U.S. Pat. No. 4,214,969). Flow channels or grooves on the surfaces of the BPP provide access for the fuel to the adjacent anode and for the oxidant to the adjacent cathode and removal of the reaction products and the unreacted remnants of fuel and oxidant. These flow channels reduce the useful surface of the BPP, as the electrical contact area is limited to the part of the surface between the channels.

The electrodes typically comprise a porous structure referred to as gas diffusion layer (GDL). The GDL(s) provide an efficient entry passage for both fuel and oxidant, respectively, to the catalyst layer as well as an exit for the reaction products away from the catalyst layer into the flow channel of the adjacent BPP. To facilitate the mass transfer between the flow channels and the GDL pores, the GDL surface area exposed to the channels is typically as large as possible. It is preferred, therefore, that a large portion of the BPP surface is consumed by the flow channels with only a small portion remaining for the electrical contact. Reduction of the electrical contact area is limited, however, by the high contact resistance between BPP and GDL. The contact area between these two is desirably sufficiently large to avoid local overheating at high current densities which would finally lead to destruction of the assembly.

Several suggestions have been made to improve the electronic contact between BPP and GDL and are known to those of skill in the art. Suitable approaches are described, for example, in U.S. Pat. Nos. 4,956,131, and 6,706,437, and in European Patents EP-A 0 955 686, EP-A 0 949 704, EP-A 0 975 040, EP-A 0 933 825, EP-A 1 030 393, and the like.

Fuel cells fabricated according to this invention are can configured as a suitable energy source for virtually any application. Such applications include, but are not limited to electric vehicles, computers, cell phones, and other electronic devices, home electrical power generation systems, and the like. Fuel cells are particularly desirable since they have been shown to exhibit high energy conversion efficiency, high power density and negligible pollution. In a vehicle such as an automobile, one convenient source of hydrogen gas can be from steam reformation of methanol, since methanol can be stored more easily in a vehicle than hydrogen.

The methods, devices, and applications described herein are intended to be illustrative and not limiting. Using the teachings provided herein, other fabrication methods and the like will be routinely practiced by those of skill in the art.

EXAMPLES

The following examples are offered to illustrate, but not to limit the claimed invention.

Example 1

Pt alloy thin film catalysts were processed through multiplayer depositions and post diffusion annealing. For alloy films with a fixed composition the thickness ratio calculated from atomic weight of the selected elements will be used to control a desired composition. For alloy films with continuously changed composition, the thickness gradient profiles were generated during the deposition process. The ion beam sputtering depositions were carried out under a typical condition of $10^4$ torr and room temperature with pure metal targets. Typical total thickness of multilayers was about 100 Å. Post annealing for inter-diffusion were carried out at 700° C. for 12 hours under $10^{-8}$ torr vacuum. The commercial carbon fiber papers were used as substrates for most of the composition studies.

The carbon nanotubes deposited on the carbon fiber papers were used for enhancing the catalyst surface area and providing a micro gas-diffusion structure. The growth procedures for carbon nanotubes on carbon fiber of Toray carbon paper were:

(1) Depositing 200 Å thick Ni on carbon fiber paper as catalysts;
(2) Putting carbon fiber paper into a tube-furnace (6' long and 2" in diameter) which connected with Ar, $H_2$ and $C_2H_4$ gas lines;
(3) Flowing Ar at 100 ml/min to push air away for 30 minutes;
(4) Flowing a mixture of Ar (50 ml/min) and H2 (10 ml/min) into tube furnace and increasing the temperature to 700° C. at 20° C./min;
(5) At 700° C., changing the mixture of gas flow to Ar (15 ml/min), $H_2$ (15 ml/min) and C2H4(50 ml/min) in tube for 10 minutes; and
(6) Cooling down the temperature to 20° C. at 20° C./min.

The procedures to spray nanotubes on carbon are:
Nanotubes were ground in an agate ball miller with ethanol. The suspension produced was smeared or sprayed on the Toray carbon paper. Pt was Ion-Beam deposited on the top surface of the smeared nanotubes. The measured catalytic effectiveness reached the level of that on grown nanotubes.

The procedures to make fuel cells involved:
(1) Dropping Nafion solution (5 mol %) on the catalyst coated carbon paper or carbon nanotubes/carbon paper and drying it in air.
(2) Cutting a piece of ElectroChem's carbon electrode covered with Pt/Ru carbon ink as catalyst (Pt:Ru=2:1, Pt=1 mg/cm$^2$) to same size as the catalyst samples.
(3) Putting the standard electrode, a membrane and the catalyst sample as a sandwich structure on the hot pressing machine. Pressing them in 1 ton pressure at 80° C. for 10 minutes to form a fuel cell membrane assembly.

All fuel cell tests were under the conditions of $O_2$ flow at 100 ml/min in the anode side chamber and $H_2$ flow at 100 ml/min in cathode side chamber. The system was sealed from air and kept in 80° C. A series of resistance (1~4700 Ohm) were used for adjust the loading of fuel cell. A Keithley multimeter was used to monitor the output voltage and current of testing fuel cells.

Example 2

A Toray® carbon paper substrate was sputtered with 400 Å of nickel. The substrate was then put in a furnace and CNT grown onto it by a CVD method. It is preferable that the CNT layer thickness is around 30 μm. The substrate can be treated with heat and/or chemicals to modify the hydrophobicity of the CNT layer. Platinum was added to the CNT layer by sputtering and/or electrodeposition. Then the sample was put under high hydrostatic pressure in a Nafion® solution. The pressure is preferably around 5000 psi. After several minutes, the sample was taken out and the substrate side without CNT was washed with ethanol. The sample was then air dried for 15 minutes at ambient temperature. Then the sample was again put into the Nafion solution under high pressure. The cycle was repeated 5 times. The finished electrode was then baked on a hotplate to remove residual solvent and hot pressed to produce an anode electrode with a Nafion® film on one side.

Example 3

A Toray® carbon paper substrate was sputtered with 400 Å of nickel. The substrate was then put into a chamber to grow CNT by CVD method. It is preferable that the CNT layer thickness is around 30 μm. The substrate can be treated with heat and/or chemicals to modify the hydrophobicity of the CNT substrate. Platinum was added to the CNT layer by sputtering and/or electrodeposition. Then a thin film of Nafion® was applied onto the CNT layer by spraying and drying. The Nafion® coated sample was put into an isopropanol solvent and hydrostatic pressures applied for 5 minutes. The sample was then taken out of the pressure vessel and dried. The finished electrode was baked on a hotplate to remove solvent and hot pressed to produce an anode electrode with a Nafion® film with on one side.

Example 4

In many embodiments of the invention described above, it is desirable to have a hydrophobic gas diffusion layer and micro-diffusion layer on an electrode in order to get better water management in a PEM fuel cell. However, is can be desirable to have an available hydrophilic electrode surface, e.g., to facilitate processing steps, such as ionomer coating or Pt electroplating. The following embodiment describes how an electroplated on one side following application of a hydrophobic coating.

The procedure includes the following steps:

1.) Dip the electrode (carbon fiber substrate bearing carbon nanotubes) sample into a diluted Teflon suspension.

2.) Sinter the Teflon loaded electrode at 315° C. for 30 minutes. The total Teflon loading is preferably to be 20% by weight.

3.) Etch the CNT side of the substrate in an argon plasma etching chamber for 5 minutes under 5 kV voltage and 100 mtorr pressure. This procedure can remove Teflon from the CNTs to a certain depth, depending, e.g., on the plasma etching time, etching current, etching voltage, etc.

4.) Sputter a 25 Å platinum electroplating seed layer onto the etched sample surface.

5.) Electroplate 0.05 mg/cm² Pt onto the CNT layer. The depth of electroplating down into CNT surfaces can be controlled by, e.g., the electroplating solution conductivity, diffusion time of plating solution into the CNT layer, etc., as described herein.

Optionally, ionomer coatings can be applied to the CNT layer after the plasma etching treatment. Optionally, perfluoroalkylsilane treated Aluminum Oxide could be used in place of Teflon in the example above.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A composition comprising a substrate bearing nanoparticles, wherein the nanoparticles are coated with an ionomer, wherein the nanoparticles are coated with a substantially continuous thin film comprising a platinum alloy, and wherein the alloy contains platinum, vanadium, nickel, and cobalt.

2. The composition of claim 1, wherein the substrate comprises a plurality of conductive fibers.

3. The composition of claim 1, wherein the ionomer comprises a perfluorocarbonsulfonic acid ionomer.

4. The composition of claim 2, wherein the conductive fibers comprise carbon fibers.

5. The composition of claim 1, wherein the nanoparticles are selected from the group consisting of: nanotubes, nanofibers, nanohorns, nanopowders, nanospheres, and quantum dots.

6. The composition of claim 1, wherein the nanoparticles comprise carbon nanotubes.

7. The composition of claim 2, wherein the plurality of conductive fibers comprise a porous electrode.

8. The composition of claim 4, wherein the carbon fibers comprise a porous electrode.

9. The composition of claim 4, wherein the carbon fibers comprise a carbon paper, a carbon cloth or a carbon-impregnated polymer.

10. The composition of claim 2, wherein the plurality of conductive fibers comprise a porous metal sheet.

11. The composition of claim 6, wherein the carbon nanotubes are seeded with one or more catalysts comprising one or more materials selected from the group consisting of Co, Ni, V, Cr, Pt, Ru, Mo, W, Ta, and Zr.

12. The composition of claim 6, wherein the carbon nanotubes are seeded with one or more catalysts selected from the group consisting of $Fe_xNi_yCo_{1-x-y}$ where $0 \leq x \leq 1$ and $0 \leq y \leq 1$, $Co_{1-x}Mo_x$ where $0 \leq x \leq 0.3$, $Co_{1-x-y}Ni_xMo_y$ where $0.1 \leq x \leq 0.7$ and $0 \leq y \leq 0.3$, $Co_{1-x-y-z}Ni_xV_yCr_z$ where $0 \leq x \leq 0.7$, $0 \leq y \leq 0.2$ and $0 \leq z \leq 0.2$, $Ni_{1-x-y}Mo_xAl_y$ where $0 \leq x \leq 0.2$ and $0 \leq y \leq 0.2$, and $Co_{1-x-y}Ni_xAl_y$ where $0 \leq x \leq 0.7$ and $0 \leq y \leq 0.2$.

13. The composition of claim 6, wherein the carbon nanotubes are seeded with one or more catalysts selected from the group consisting of: $Co_{8.8}Mo_{1.2}$, $Co_{2.2}Ni_{5.6}Mo_{2.2}$, $Co_{5.7}Ni_{2.1}V_{1.1}Cr_{1.1}$, $Ni_{8.0}Mo_{1.0}Al_{1.0}$, and $Co_{6.4}Ni_{2.4}Al_{1.2}$.

14. The composition of claim 6, wherein the nanoparticles are nanotubes having a length less than 50 μm and a diameter less than about 500 nm.

15. The composition of claim 6, wherein the nanoparticles are nanotubes having a diameter in the range from about 1 nm to about 100 nm.

16. The composition of claim 1, wherein the thin film partially covers the nanoparticles.

17. The composition of claim 1, wherein the nanoparticles are fully coated with the thin film.

18. The composition of claim 1, wherein the thin film ranges in thickness from about 1 to about 1000 angstroms.

19. The composition of claim 18, wherein the thin film ranges in thickness from about 5 to about 500 angstroms.

20. The composition of claim 18, wherein the thin film ranges in thickness from about 5 to about 100 angstroms.

21. A composition comprising a substrate bearing nanoparticles, wherein the nanoparticles are coated with an ionomer, wherein the nanoparticles are coated with a non-continuous thin film comprising a platinum alloy, and wherein the thin film comprises islands ranging in thickness from about 5 to about 100 angstroms and ranging in area from about 1 to $10^4$ nm².

22. The composition of claim 20, wherein the thin film alloy further comprises and one or more metals selected from the group consisting of Mo, Ta, W, and Zr.

23. The composition of claim 22, wherein platinum comprises from about 12% up to about 99% mole ratio or atomic percentage of the alloy.

24. The composition of claim 22, wherein platinum comprises up to about 50% mole ratio or atomic percentage of the alloy.

25. The composition of claim 22, wherein the thin film comprises an alloy having the formula:

$Pt_xV_yCo_zNi_w$ wherein:

x is greater than 0.06 and less than 1;

y, z, and w are independently greater than zero and less than 1;

x+y+z+w=1.

26. The composition of claim 25, wherein x is 0.12.

27. The composition of claim 25, wherein x is 0.12, y is 0.07, z is 0.56, and w is 0.25.

* * * * *